United States Patent [19]

Fite et al.

[11] Patent Number: 5,067,069

[45] Date of Patent: Nov. 19, 1991

[54] CONTROL OF MULTIPLE FUNCTIONAL UNITS WITH PARALLEL OPERATION IN A MICROCODED EXECUTION UNIT

[75] Inventors: Elaine H. Fite; Tryggve Fossum, both of Northboro; William R. Grundmann, Hudson; Francis X. McKeen, Westboro; Ronald M. Salett, Framingham, all of Mass.

[73] Assignee: Digital Equipment Corporation, Maynard, Mass.

[21] Appl. No.: 306,832

[22] Filed: Feb. 3, 1989

[51] Int. Cl.$^5$ .......................... G06F 9/22; G06F 9/28; G06F 9/30; G06F 9/38

[52] U.S. Cl. ................................. 395/375; 364/262.4; 364/262.8; 364/262.9; 364/263; 364/263.1; 364/263.2; 364/DIG. 2

[58] Field of Search ... 364/200 MS File, 900 MS File, 364/736

[56] References Cited

U.S. PATENT DOCUMENTS

| | | | |
|---|---|---|---|
| 3,949,379 | 4/1976 | Ball | 340/172.5 |
| 4,392,200 | 7/1983 | Arulpragasam | 364/200 |
| 4,395,758 | 7/1983 | Helenius et al. | 364/200 |
| 4,454,578 | 6/1984 | Matsumoto et al. | 364/200 |
| 4,467,409 | 8/1984 | Potash et al. | 364/200 |
| 4,509,116 | 4/1985 | Lackey et al. | 364/200 |
| 4,521,851 | 6/1985 | Trubisky et al. | 364/200 |
| 4,543,626 | 9/1985 | Bean et al. | 364/200 |
| 4,594,659 | 6/1986 | Guenthner et al. | 364/200 |
| 4,594,660 | 6/1986 | Guenthner et al. | 364/200 |
| 4,783,738 | 11/1988 | Li et al. | 364/200 |
| 4,943,912 | 7/1990 | Aoyama et al. | 364/200 |

OTHER PUBLICATIONS

Fossum et al., "An Overview of the VAX 8600 System," Digital Technical Journal, No. 1, Aug. 1985, pp. 8-23.

Troiani et al., "The VAX 8600 I Box, A Pipelined Implementation of the VAX Architecture," Digital Technical Journal, No. 1, Aug. 1985, pp. 24-42.

Fossum et al., "The F Box, Floating Point in the VAX 8600 System," Digital Technical Journal, No. 1, Aug. 1985, pp. 43-53.

G. Desrochers, *Principles of Parallel and Multiprocessing*, Intertext Publications, Inc., McGraw-Hill Book Co., 1987, pp. 154-163.

*Primary Examiner*—Thomas C. Lee
*Assistant Examiner*—Daniel Pan
*Attorney, Agent, or Firm*—Arnold, White & Durkee

[57] ABSTRACT

To increase the performance of a pipelined processor executing various classes of instructions, the classes of instructions are executed by respective functional units which are independently controlled and operated in parallel. The classes of instructions include integer instructions, floating point instructions, multiply instructions, and divide instructions. The integer unit, which also performs shift operations, is controlled by the microcode execution unit to handle the wide variety of integer and shift operations included in a complex, variable-length instruction set. The other functional units need only accept a control command to initiate the operation to be performed by the functional unit. The retiring of the results of the instructions need not be controlled by the microcode execution unit, but instead is delegated to a separate retire unit that services a result queue. When the microcode execution unit determines that a new operation is required, an entry is inserted into the result queue. The entry includes all the information needed by the retire unit to retire the result once the result is available from the respective functional unit. The retire unit services the result queue by reading a tag in the entry at the head of the queue to determine the functional unit that is to provide the result. Once the result is available and the destination specified by the entry is also available, the result is retired in accordance with the entry, and the entry is removed from the queue.

20 Claims, 14 Drawing Sheets

EX BUS

TR BUS

CONTROL OF MULTIPLE FUNCTIONAL UNITS WITH PARALLEL OPERATION IN A MICROCODED EXECUTION UNIT

RELATED APPLICATION

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989 now abandoned; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; D. Fite, et al., SOURCE LIST, POINTER QUEUES AND DESTINATION QUEUE, Ser. No. 07/306,843 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Flynn et al., METHOD AND MEANS FOR ARBITRATING COMMUNICATION REQUESTS USING A SYSTEM CONTROL UNIT IN A MULTIPROCESSOR SYSTEM, Ser. No. 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTIPROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989 now abandoned.

1. Technical Field

The present invention relates generally to digital computers and, more particularly, to a system for resolving data dependencies during the preprocessing of multiple instructions prior to execution of those instructions in a digital computer. This invention is particularly applicable to the preprocessing of multiple instructions in a pipelined digital computer system using a variable-length complex instruction set (CIS) architecture.

2. Description of Related Art

Preprocessing of instructions is a common expedient used in digital computers to speed up the execution of large numbers of instructions. The preprocessing operations are typically carried out by an instruction unit interposed between the memory that stores the instructions and the execution unit that executes the instructions. The preprocessing operations include, for example, the prefetching of operands identified by operand specifiers in successive instructions so that the operands are readily available when the respective instructions are loaded into the execution unit. The instruction unit carries out the preprocessing operations for subsequent instructions while a current instruction is being executed by the execution unit, thereby reducing the overall processing time for any given sequence of instructions.

Designers often separate instructions into classes, and design dedicated hardware optimized for each class. This dedicated hardware almost invariably is microcoded. This is done because complex instructions require a regular, yet flexible datapath that can be used repeatedly to perform the intricate operations required by complex instructions. The exact operations are often data dependent, requiring microcode interpretation. The common microcode implementation is to issue an instruction, fetch source operands, execute, and store results. The execution has been done with single threaded microcode, and the functional units have been controlled in serial fashion by such microcode.

SUMMARY OF THE INVENTION

To increase the performance of a pipelined processor executing various classes of instructions, the classes of instructions are executed by respective functional units which are operated in parallel. The classes of instructions having the separate functional units include integer instructions, floating point instructions, multiply instructions, and divide instructions.

In accordance with another aspect of the invention, the cycle-by-cycle operations of the various functional units are independently controlled. Only the integer unit has its cycle-by-cycle operations microcontrolled by the microcode execution unit in the instruction execution unit. The integer unit, which also performs shift operations, is controlled by the microcode execution unit to handle the wide variety of integer and shift operations included in a complex, variable-length instruction set. The other functional units accept microcode commands, but their cycle-by-cycle operations are not microcode controlled. Instead, the other functional units need only accept a control command, which is an encoding of the instruction opcode, that specifies to the functional unit the specific operation to perform. In a pipelined functional unit, such as the floating point unit, this control command is pipelined along with the data, and can be modified slightly as the pipelined operations take place to reflect data dependencies.

In accordance with yet another aspect of the invention, the retiring of the results of the instructions is not controlled by the microcode execution unit, but instead is delegated to a separate retire unit that services a result queue. When the microcode execution unit determines that a new operation is required, the respective functional unit is not busy, the source operands are available, and the destination for the result is known, then an entry is inserted into the result queue. The entry includes all the information needed by the retire unit to retire the result once the result is available from the respective functional unit. The retire unit services the result queue by reading a tag in the entry at the head of the queue to determine the functional unit that is to provide the result. Once the result is available and the destination specified by the entry is also available, the result is retired in accordance with the entry, and the entry is removed from the queue.

Preferably the operations are queued in the result queue, and the results retired, in the sequence in which the corresponding instructions appear in the instruction stream. This helps decouple the tasks of decoding source specifiers, fetching source operands and storing results from microcode. The issuing and retiring of instructions need not be controlled by the microcode, only "allowed" or "disallowed". Thus when microcode is not doing anything that precludes execution in the other units, like interrupt handling, the other units are allowed to proceed on their own.

BRIEF DESCRIPTION OF THE DRAWINGS

Other objects and advantages of the invention will become apparent upon reading the following detailed description and upon reference to the drawings in which.

Figure 1:
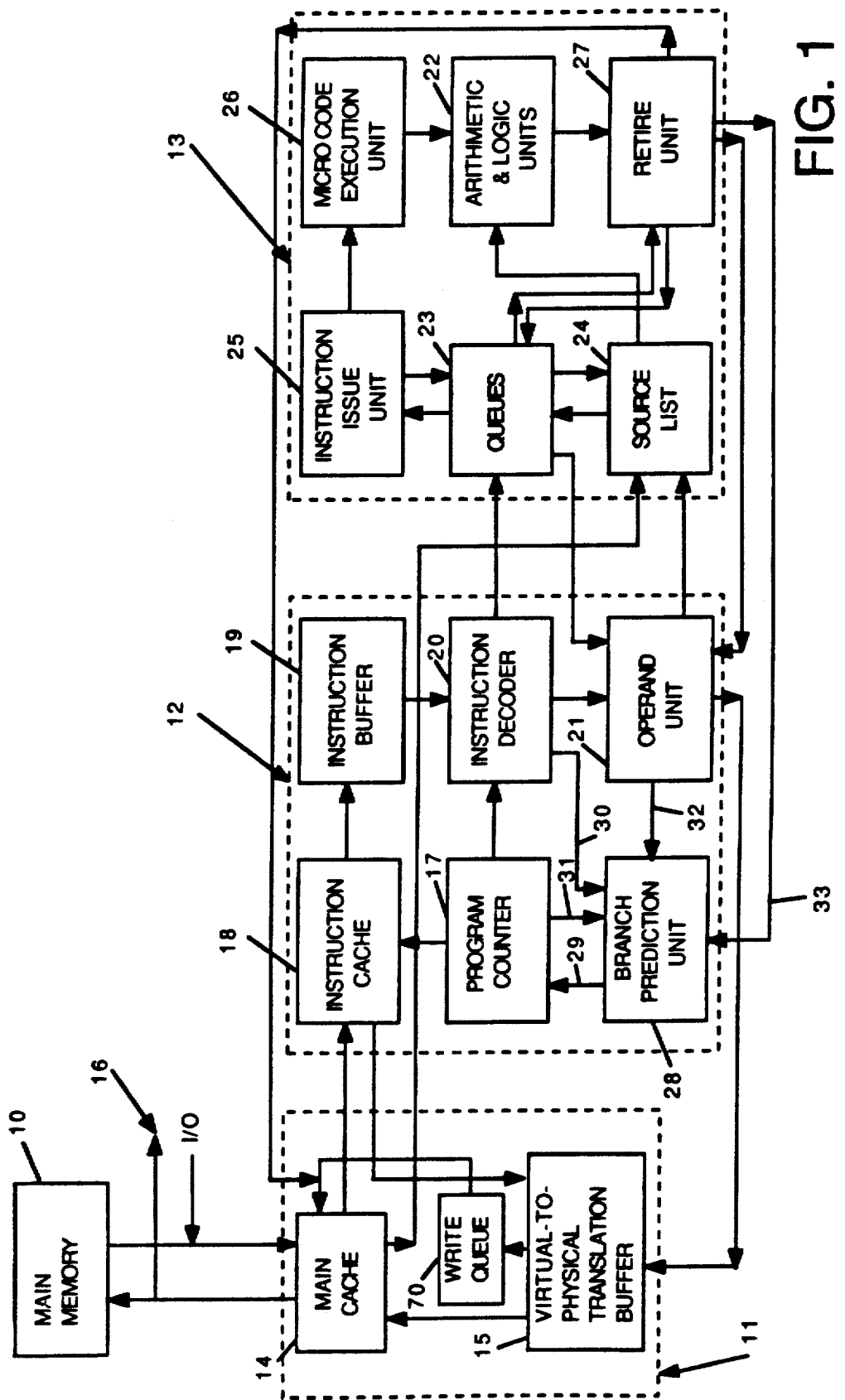
FIG. 1 is a block diagram of a digital computer system having a central pipelined processing unit which employs the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings and referring first to FIG. 1, there is shown a portion of a digital computer system which includes a main memory 10, a memory-CPU interface unit 11, and at least one CPU comprising an instruction unit 12 and an execution unit 13. It should be understood that additional CPUs could be used in such a system by sharing the main memory 10. It is practical, for example, for up to four CPUs to operate simultaneously and communicate efficiently through the shared main memory 10.

Both data and instructions for processing the data are stored in addressable storage locations within the main memory 10. An instruction includes an operation code (opcode) that specifies, in coded form, an operation to be performed by the CPU, and operand specifiers that provide information for locating operands. The execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped in a pipelined operation, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

In the particular system illustrated in FIG. 1, the interface unit 11 includes a main cache 14 which on an average basis enables the instruction and execution units 12 and 13 to process data at a faster rate than the access time of the main memory 10. This cache 14 includes means for storing selected predefined blocks of data elements, means for receiving requests from the instruction unit 12 via a translation buffer 15 to access a specified data element, means for checking whether the data element is in a block stored in the cache, and means operative when data for the block including the specified data element is not so stored for reading the specified block of data from the main memory 10 and storing that block of data in the cache 14. In other words, the cache provides a "window" into the main memory, and contains data likely to be needed by the instruction and execution units.

If a data element needed by the instruction and execution units 12 and 13 is not found in the cache 14, then the data element is obtained from the main memory 10, but in the process, an entire block, including additional data, is obtained from the main memory 10 and written into the cache 14. Due to the principle of locality in time and memory space, the next time the instruction and execution units desire a data element, there is a high degree of likelihood that this data element will be found in the block which includes the previously addressed data element. Consequently, there is a high degree of likelihood that the cache 14 will already include the data element required by the instruction and execution units 12 and 13. In general, since the cache 14 will be accessed at a much higher rate than the main memory 10, the main memory can have a proportionally slower access time than the cache without substantially degrading the average performance of the data processing system. Therefore, the main memory 10 can be comprised of slower and less expensive memory elements.

The translation buffer 15 is a high speed associative memory which stores the most recently used virtual-to-physical address translations. In a virtual memory system, a reference to a single virtual address can cause several memory references before the desired information is made available. However, where the translation buffer 15 is used, translation is reduced to simply finding a "hit" in the translation buffer 15.

An I/O bus 16 is connected to the main memory 10 and the main cache 14 for transmitting commands and input data to the system and receiving output data from the system.

The instruction unit 12 includes a program counter 17 and an instruction cache 18 for fetching instructions from the main cache 14. The program counter 17 preferably addresses virtual memory locations rather than the physical memory locations of the main memory 10 and the cache 14. Thus, the virtual address of the program counter 17 must be translated into the physical address of the main memory 10 before instructions can be retrieved. Accordingly, the contents of the program counter 17 are transferred to the interface unit 11 where the translation buffer 15 performs the address conversion. The instruction is retrieved from its physical memory location in the cache 14 using the converted address. The cache 14 delivers the instruction over data return lines to the instruction cache 18. The organization and operation of the cache 14 and the translation buffer 15 are further described in Chapter 11 of Levy and Eckhouse, Jr., Computer Programming and Architecture, The VAX-11, Digital Equipment Corporation, pp. 351-368 (1980).

Most of the time, the instruction cache has prestored in it instructions at the addresses specified by the program counter 17, and the addressed instructions are available immediately for transfer into an instruction buffer 19. From the buffer 19, the addressed instructions are fed to an instruction decoder 20 which decodes both the op-codes and the specifiers. An operand processing unit (OPU) 21 fetches the specified operands and supplies them to the execution unit 13.

The OPU 21 also produces virtual addresses. In particular, the OPU 21 produces virtual addresses for memory source (read) and destination (write) operands. For at least the memory read operands, the OPU 21 must deliver these virtual addresses to the interface unit 11 where they are translated to physical addresses. The physical memory locations of the cache 14 are then accessed to fetch the operands for the memory source operands.

In each instruction, the first byte contains the opcode, and the following bytes are the operand specifiers to be decoded. The first byte of each specifier indicates the addressing mode for that specifier. This byte is usually broken in halves, with one half specifying the addressing mode and the other half specifying a register to be used for addressing. The instructions preferably have a variable length, and various types of specifiers can be used with the same opcode, as disclosed in Strecker et al., U.S. Pat. No. 4,241,397 issued Dec. 23, 1980.

The first step in processing the instructions is to decode the "opcode" portion of the instruction. The first portion of each instruction consists of its opcode which specifies the operation to be performed in the instruction. The decoding is done using a table-look-up technique in the instruction decoder 20. The instruction decoder finds a microcode starting address for executing the instruction in a look-up table and passes the starting address to the execution unit 13. Later the execution unit performs the specified operation by executing prestored microcode, beginning at the indicated starting address. Also, the decoder determines where source-operand and destination-operand specifiers occur in the instruction and passes these specifiers to the OPU 21 for pre-processing prior to execution of the instruction.

The look-up table is organized as an array of multiple blocks, each having multiple entries. Each entry can be addressed by its block and entry index. The opcode byte addresses the block, and a pointer from an execution point counter (indicating the position of the current specifier in the instruction) selects a particular entry in the block. The output of the lookup table specifies the data context (byte, word, etc.), data type (address, integer, etc.) and accessing mode (read, write, modify, etc.) for each specifier, and also provides a microcode dispatch address to the execution unit.

After an instruction has been decoded, the OPU 21 parses the operand specifiers and computes their effective addresses; this process involves reading GPRs and possibly modifying the GPR contents by autoincrementing or autodecrementing. The operands are then fetched from those effective addresses and passed on to the execution unit 13, which later executes the instruction and writes the result into the destination identified by the destination pointer for that instruction.

Each time an instruction is passed to the execution unit, the instruction unit sends a microcode dispatch address and a set of pointers for (1) the locations in the execution-unit register file where the source operands can be found, and (2) the location where the results are to be stored. Within the execution unit, a set of queues 23 includes a fork queue for storing the microcode dispatch address, a source pointer queue for storing the source-operand locations, and a destination pointer queue for storing the destination location. Each of these queues is a FIFO buffer capable of holding the data for multiple instructions.

The execution unit 13 also includes a source list 24, which is a multi-ported register file containing a copy of the GPRs and a list of source operands. Thus entries in the source pointer queue will either point to GPR locations for register operands, or point to the source list for memory and literal operands. Both the interface unit 11 and the instruction unit 12 write entries in the source list 24, and the execution unit 13 reads operands out of the source list as needed to execute the instructions. For executing instructions, the execution unit 13 includes an instruction issue unit 25, a microcode execution unit 26, an arithmetic and logic unit (ALU) 22, and a retire unit 27.

Figure 2:
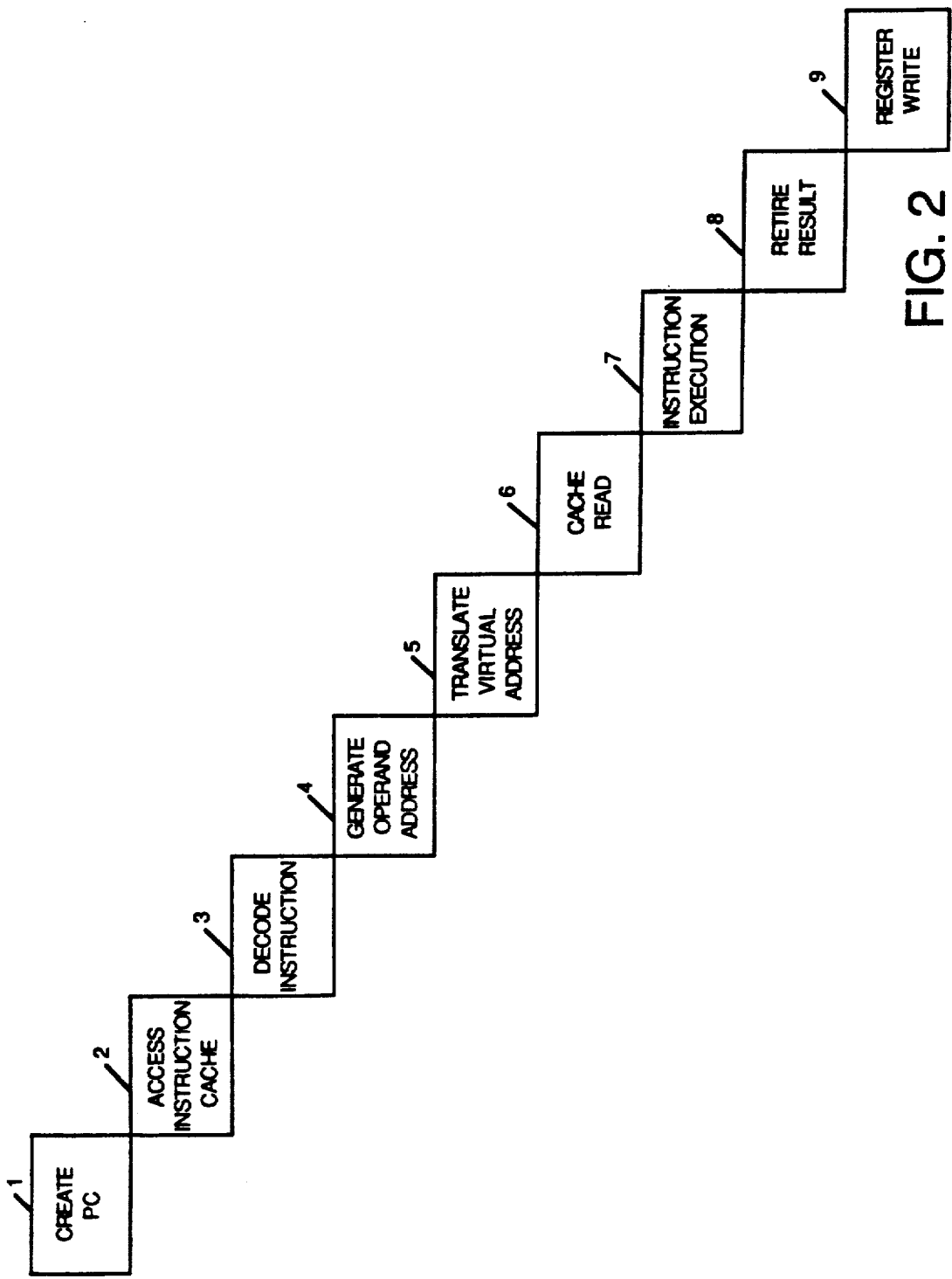
FIG. 2 is a diagram showing various steps performed to process an instruction and which may be performed in parallel for different instructions by a pipelined instruction processor according to FIG. 1.

The present invention is particularly useful with pipelined processors. As discussed above, in a pipelined processor the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

ADDL3 R0,B^12(R1),R2.

This is a long-word addition using the displacement mode of addressing.

In the first stage of the pipelined execution of this instruction, the program count (PC) of the instruction is created; this is usually accomplished either by incrementing the program counter from the previous instruction, or by using the target address of a branch instruction. The PC is then used to access the instruction cache 18 in the second stage of the pipeline.

In the third stage of the pipeline, the instruction data is available from the cache 18 for use by the instruction decoder 20, or to be loaded into the instruction buffer 19. The instruction decoder 20 decodes the opcode and the three specifiers in a single cycle, as will be described in more detail below. The R1 number along with the byte displacement is sent to the OPU 21 at the end of the decode cycle.

In stage 4, the R0 and R2 pointers are passed to the queue unit 23. Also, the operand unit 21 reads the contents of its GPR register file at location R1, adds that value to the specified displacement (12), and sends the resulting address to the translation buffer 15 in the interface unit 11, along with an OP READ request, at the end of the address generation stage. A pointer to a reserved location in the source list for receiving the second operand is passed to the queue unit 23. When the OP READ request is acted upon, the second operand read from memory is transferred to the reserved location in the source list.

In stage 5, the interface unit 11 uses the translation buffer 15 to translate the virtual address generated in stage 4 to a physical address. The physical address is then used to address the cache 14, which is read in stage 6 of the pipeline.

In stage 7 of the pipeline, the instruction is issued to the ALU 22 which adds the two operands and sends the result to the retire unit 27. During stage 4, the register numbers for R0 and R2, and a pointer to the source list location for the memory data, were sent to the execution unit and stored in the pointer queues. Then during the cache read stage, the execution unit started to look for the two source operands in the source list. In this particular example it finds only the register data in R0, but at the end of this stage the memory data arrives and is substituted for the invalidated read-out of the register file. Thus both operands are available in the instruction execution stage.

In the retire stage 8 of the pipeline, the result data is paired with the next entry in the result queue. Also at this time the condition codes, upon which the branch decisions are based, are available. Although several functional execution units can be busy at the same time, only one instruction can be retired in a single cycle.

In the last stage 9 of the illustrative pipeline, the data is written into the GPR portion of the register files in both the execution unit 13 and the instruction unit 12.

It is desirable to provide a pipelined processor with a mechanism for predicting the outcome of conditional branch decisions to minimize the impact of stalls or "gaps" in the pipeline. This is especially important for the pipelined processor of FIG. 1 since the queues 23 may store the intermediate results of a multiplicity of instructions. When stalls or gaps occur, the queues lose their effectiveness in increasing the throughput of the processor. The depth of the pipeline, however, causes the "unwinding" of an instruction sequence in the event of an incorrect prediction to be more costly in terms of hardware or execution time. Unwinding entails the flushing of the pipeline of information from instructions in the wrong path following a branch that was incorrectly predicted, and redirecting execution along the correct path.

As shown in FIG. 1, the instruction unit 12 of the pipeline processor is provided with a branch prediction unit 28. The specific function of the branch prediction unit 28 is to determine or select a value (PREDICTION PC) that the program counter 17 assumes after having addressed a branch instruction. This value or selection is transmitted over a bus 29 from the branch prediction unit 28 to the program counter unit 17.

The branch prediction unit 28 responds to four major input signals. When the instruction decoder 20 receives a branch opcode from the instruction buffer 19, branch opcode information and a branch opcode strobe signal (BSHOP) are transmitted over an input bus 30 to the branch prediction unit. At the same time, the address of the branch instruction (DECODE PC) is received on an input bus 31 from the program counter unit 17. The target address of the branch instruction (TARGET PC) and a target address strobe signal (TARGET VALID) are received on an input bus 32 from the operand unit 21. The operand unit 21, for example, adds the value of a displacement specifier in the branch instruction to the address of the instruction following the branch instruction to compute the target address. For conditional branches, the branch decision is made, and the prediction is validated, by a validation signal (BRANCH VALID) received with a data signal (BRANCH DECISION) on a bus 33 from the execution unit 13.

During the execution of most instruction sequences, the branch prediction unit 28 first receives a branch opcode and its corresponding address, next receives the corresponding target address, and finally receives a validation signal. The branch prediction unit 28 responds to this typical sequence by making a branch prediction as soon as the branch opcode and its corresponding address are received.

If a conditional branch instruction is validated, then execution continues normally. Otherwise, when the branch decision disagrees with the prediction, an "unwind" operation is performed. This involves recording the decision in the branch history cache and then redirecting the instruction stream. The instruction stream is redirected by restoring the state of the central processing unit to the state which existed at the time the prediction was made, and then restarting execution at the beginning of the alternate execution path from the branch instruction. Execution is restarted, for example, at the previously saved "unwind" address (UNWIND PC). The construction and operation of the preferred branch prediction unit is further described in the above referenced D. Fite et al. U.S. patent application Ser. No. 07/306,760, filed Feb. 3, 1989, and entitled "Branch Prediction," which is incorporated herein by reference.

Figure 3:
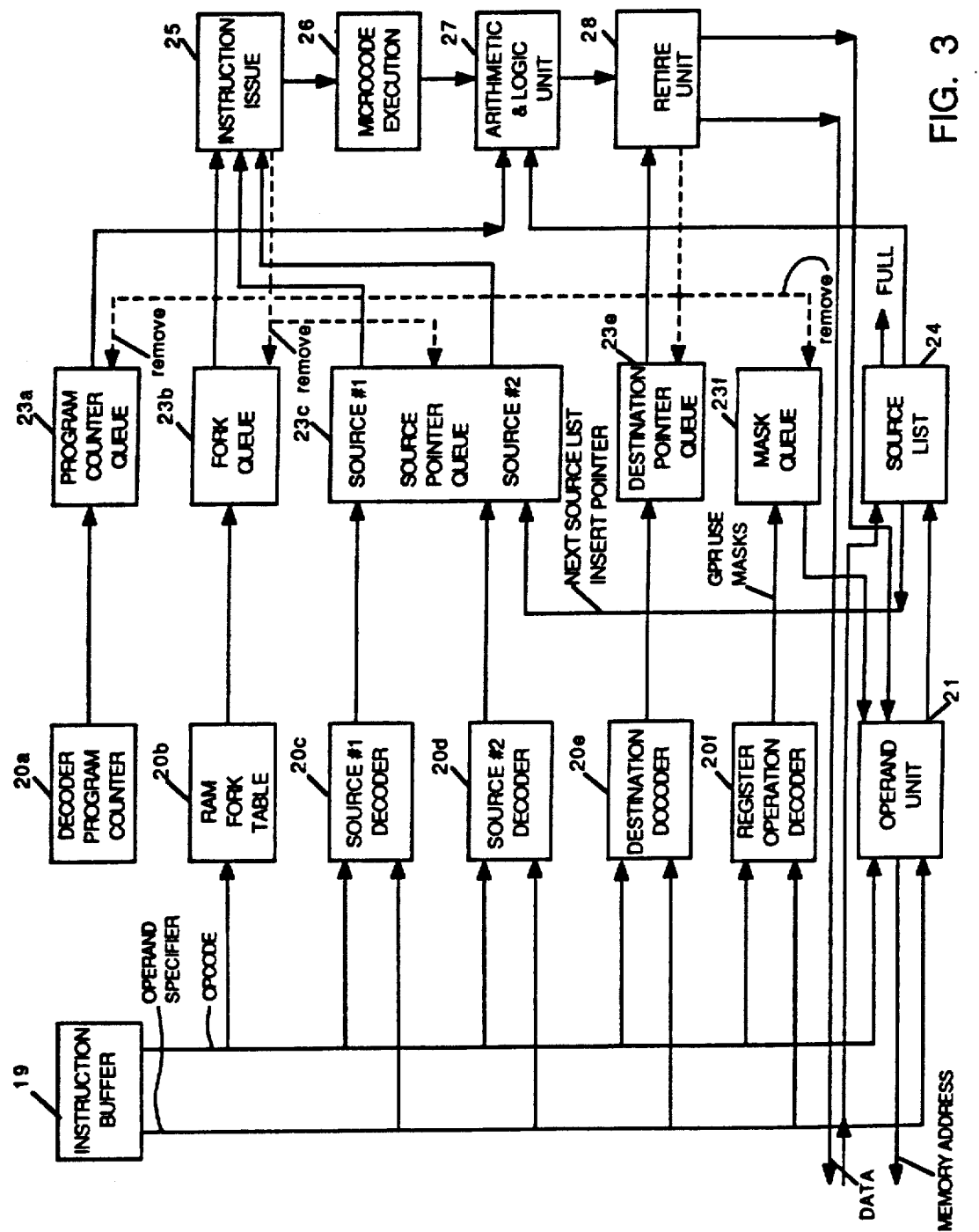
FIG. 3 is a block diagram of the instruction processor of FIG. 1 showing in further detail the queues inserted between the instruction unit and the execution unit.

The instruction decoder 20 in the instruction unit 12, and the queues 23 in the execution unit 13, are shown in more detail in FIG. 3. It can be seen that the decoder 20 includes a decoder 20a for the program counter, a fork table RAM 20b, two source-operand specifier decoders 20c and 20d, a destination-operand specifier decoder 20e, and a register-operation decoder 20f which will be described in detail below. In a preferred embodiment, the decoders 20c-20f are intimately interlinked and integrated into a large complex decode unit, as further described in the above referenced Fite et al. U.S. patent application Ser. No. 07/307,347, filed Feb. 3, 1989, entitled "Decoding Multiple Specifiers in a Variable Length Instruction Architecture," incorporated herein by reference. The decoder 20b is preferably located in the execution unit next to the fork queue 23b instead of in the instruction unit, because the fork addresses include more bits than the opcodes, and therefore fewer data lines between the instruction unit and the execution unit are required in this case.

The output of the program-counter decoder 20a is stored in a program counter queue 23a in the execution unit 13. The RAM 20b receives only the opcode byte of each instruction, and uses that data to select a "fork" (microcode) dispatch address from a table. This dispatch address identifies the start of the microcode appropriate to the execution of the instruction, and is stored in a fork queue 23b in the execution unit 13.

Each of the four decoders 20c-20f receives both the opcode byte and the operand specifier data from the instruction buffer 19. The decoders 20c and 20d decode two source-operand specifiers to generate source-operand pointers which can be used by the execution unit to locate the two source operands. These two pointers are stored in a source-pointer queue 23c in the execution unit. The destination-operand specifier is decoded by the decoder 20e to generate a destination-operand pointer which is stored in a destination-pointer queue 23e in the execution unit.

In order to check for the register conflicts discussed above, a pair of masks are generated each time a new instruction is decoded, to identify all GPRs that the execution unit will read or write during the execution of that instruction. These masks are generated in the register-operation decoder 20f (described below in connection with FIG. 4) and are stored in a mask queue 23f in the instruction unit. Each mask comprises a number of bit positions equal to the number of GPRs. In the read mask, a bit is set for each GPR to be read during execution of the new instruction, and in the write mask, a bit is set for each GPR to be written during execution of that instruction.

Both the read and write masks for a given instruction are stored as a single entry in the mask queue 23f. When there are fifteen GPRs, each entry in the mask queue consists of thirty bits (fifteen bits in each read mask to identify GPRs to be read and fifteen bits in each write mask to identify GPRs to be written). The composite of all the valid masks in the mask queue 23f is used to check each register to be used to produce a memory address during the preprocessing of instructions in the instruction unit 12 to determine whether the preprocessing of that instruction should be stalled. The preferred construction and operation of the mask queue 23f is further described in the above referenced Murray et al. U.S. application Ser. No. 07/306,773, filed Feb. 3, 1989, and entitled "Multiple Instruction Processing System With Data Dependency Resolution," which is incorporated herein by reference. This reference also shows in detail the basic construction of a queue, including its insert pointer, its remove pointer, logic for detecting when the queue is full, and logic for flushing the queue.

Figure 4:
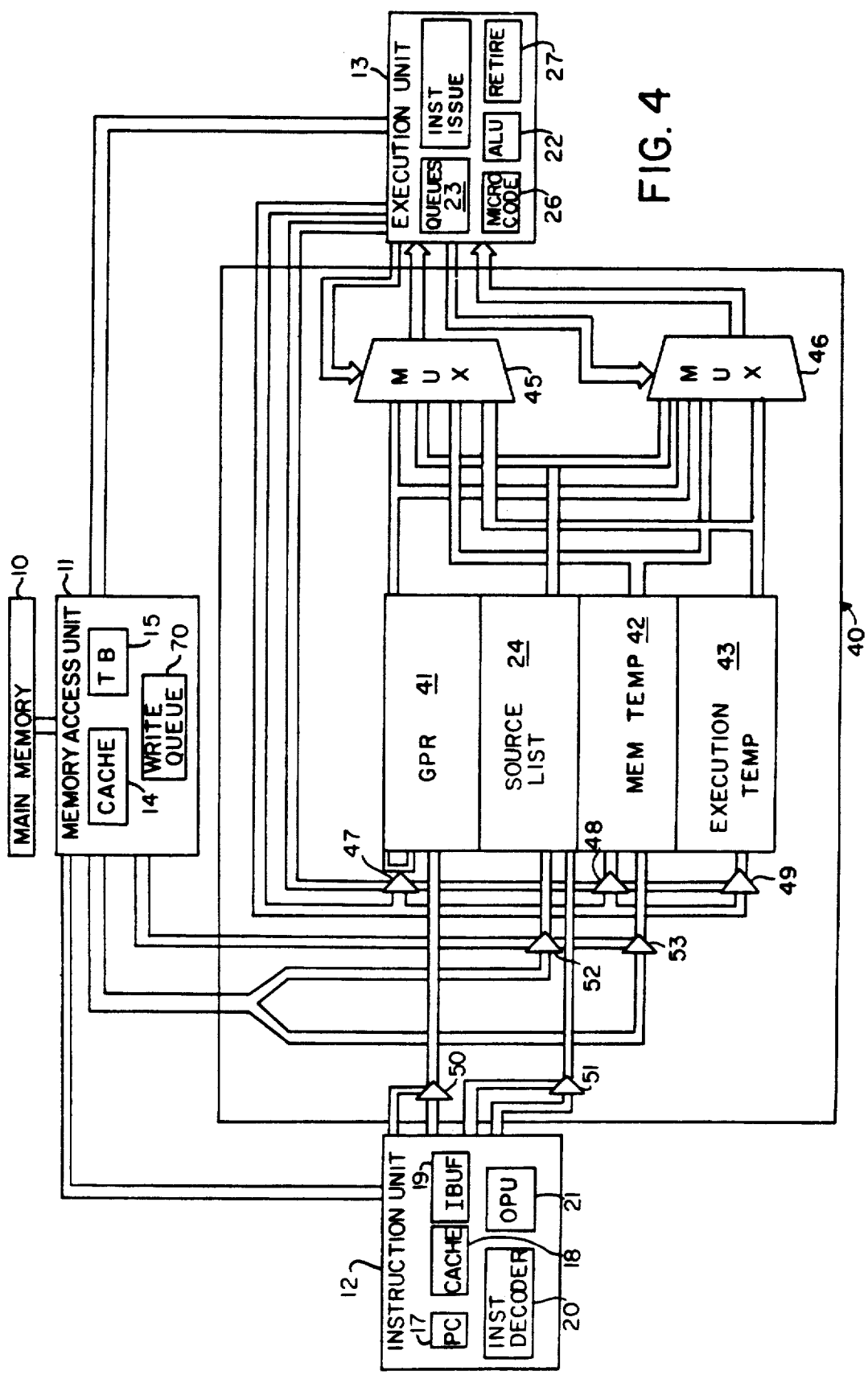
FIG. 4 is a block diagram of the instruction decoder in FIG. 1 showing in greater detail the data paths associated with the source list and the other registers that are used for exchanging data among the instruction unit, the memory access unit and the execution unit.

Turning now to FIG. 4, there is shown a more detailed block diagram of the source list 24 and related register files collectively designated 40, which are integrated together in a pair of self-timed register file integrated circuits. This self-timed register file 40 provides the data interface between the memory access unit 11, instruction unit 12 and execution unit 13.

Preferably, the register file 40 include four sets of sixteen registers with each register being 36-bits in length. In this case, two of the same kind of integrated circuits are used in combination to provide the four sets of sixteen 36-bit registers. Each register is configured to contain four bytes plus a parity bit for each byte. The four sets respectively correspond to GPRs 41, the source list 24, memory temporary registers 42 and execution temporary registers 43. These registers have dual-port outputs and include a pair of multiplexers 45, 46 having their inputs connected to each of the sixteen registers in each of the four sets of registers. The 36-bit multiplexer outputs are connected directly to the execution unit 13. Select lines are connected between the execution unit 13 and the select inputs of the multiplexer 45, 46. These select lines provide a 6-bit signal to allow addressing of each of the sixty-four individual registers. The inputs to each of the registers 41, 24, 42, 43 are also of the dual-port variety and accept both A and B data inputs. However, it should be noted that while the four sets of registers are each of the dual-port variety, the register file 40 receives inputs from three distinct sources and routes those inputs such that no more than two inputs are delivered to any one of the four sets of registers.

As introduced above, the source list 24 is a register file containing source operands. Thus, entries in the source pointer queue of the execution unit 13 point to the source list for memory and immediate or literal operands. Both the memory access unit 11 and the instruction unit 12 write entries to the source list 24, and the execution unit 13 reads operands out of the source list as needed to execute the instructions.

The GPRs 41 include sixteen general purpose registers as defined by the VAX architecture. These registers provide storage for source operands and the results of executed instructions. Further, the execution unit 13 writes results to the GPRs 41, while the instruction unit 13 updates the GPRs 41 for autoincrement and autodecrement instructions.

The memory temporary registers 42 include sixteen registers readable by the execution unit 13. The memory access unit 11 writes into the memory temporary registers 42 data requested by the execution unit 13. Further, the microcode execution unit 26 may also write to the memory temporary registers as needed during microcode execution.

The execution temporary registers 43 include sixteen registers accessible by the execution unit 13 alone. More specifically, the microcode execution unit 13 uses the execution temporary registers 43 for intermediate storage.

The execution unit 13 is connected to the GPRs 41, the memory temporary register 42, and the execution temporary register 43 via a 36-bit data bus. Transmission gates 47, 48 and 49 respectively control the data delivered from the execution unit data bus to the GPRs 41, memory temporary registers 42, and execution temporary register 43 via a 6-bit select bus connected to the select inputs of the transmission gates 47, 48 and 49. Similarly, the instruction unit 12 is connected to the B inputs of GPRs 41 and source list 24 via transmission gates 50, 51. In this case, however, the select lines of the transmission gates 50, 51 are separate from one another and are controlled independently.

The memory access unit 11 has a 72-bit data bus and, thus, preferably writes to a pair of 36-bit registers. Therefore, the bus is split into a low order 36-bit portion and a high order 36-bit portion to allow the data to be stored at consecutive register addresses. The low order 36-bits are delivered to either the source list 24 through transmission gate 52, or through transmission gate 53 to the memory temporary register 42. Physically, in the preferred implementation introduced above using two of the same kind of integrated circuits, the higher-order 18 bits of each 36 bit portion are stored in one of the integrated circuits, and the corresponding lower-order 18 bits of the 36 bit portion are stored on the other integrated circuit.

The memory access unit 11 also delivers a 6-bit select bus to the transmission gates 52, 53. The additional bit is used to allow the memory access unit 12 to write the high order 36-bits being delivered to the next sequential register of either the source list 24 through transmission gate 52, or through transmission gate 53 to the memory temporary register 42. Thus, the high order 36-bits are stored in either the source list 24 or the memory temporary register 42 at a location one greater than the low order 36-bits stored in the same register. Therefore, when the execution unit 13 retrieves the data stored in the source list and memory temporary registers 24, 42 it first retrieves the data stored in the low order 36-bits, increments its internal pointer, and then retrieves the high order 36-bits.

Figure 5:
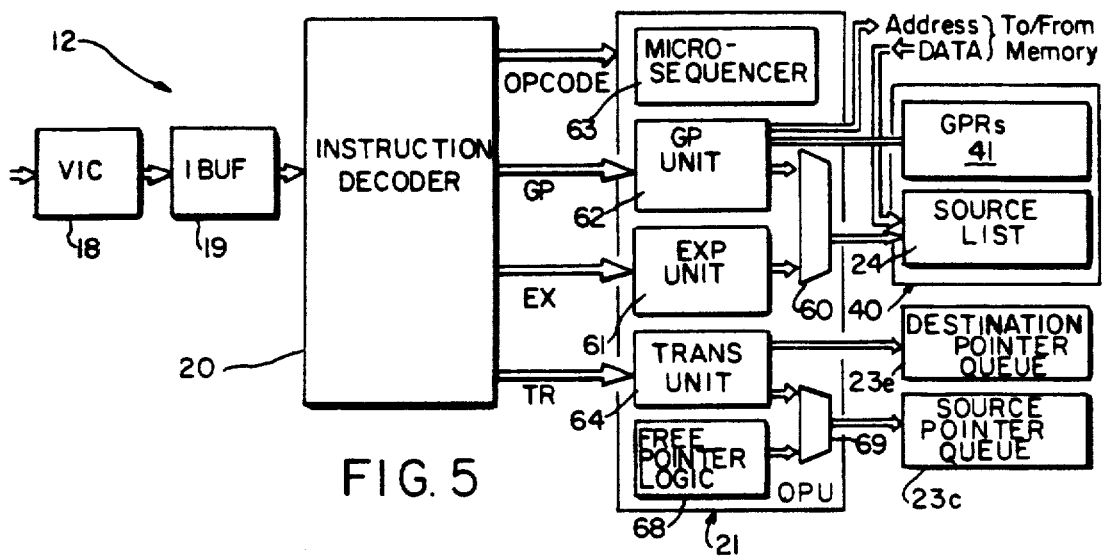
FIG. 5 is a block diagram showing the data path through the instruction unit to the queues.

Turning now to FIG. 5, the data path through the instruction unit is shown in greater detail. The instruction decoder 20 has the ability to simultaneously decode two source specifiers and one destination specifier. During a clock cycle, one of the source specifiers can be a short literal specifier. In this case the decoded short literal is transmitted over an EX bus to an expansion unit that expands the short literal to one or more 32-bit longwords sufficient to represent or convert that short literal to the data type specified for that specifier for the instruction currently being decoded.

The instruction decoder has the ability to decode one "complex" source or destination specifier during each clock cycle. By complex it is meant that the specifier is neither a register specifier nor a short literal specifier. A complex specifier, for example, may include a base register number, an index register number, and a displacement, and can have various modes such as immediate, absolute, deferred, and the autoincrement and autodecrement modes. Evaluation of complex specifiers for some of these modes requires address computation and a memory read operations, which are performed by a GP or address computation unit 62.

For the evaluation of a branch displacement or immediate data (i.e., a long literal found in the instruction stream), it is not necessary for the GP unit to initiate a memory read operation. In the case of a branch displacement, the GP unit transmits the displacement directly to the branch prediction unit (28 in FIG. 1). For immediate data, the GP unit transmits the data to the source list 24. Since the source list has a single port available for the operand processing unit 21, a multiplexer 60 is included in the operand processing unit for selecting 32-bit words of data from either the GP unit 62 or the EXP unit 61. Priority is given to a valid expansion of a short literal.

Normally register specifiers are not evaluated by the instruction unit, but instead register pointers (i.e., the GIR numbers) are passed to the execution unit. This avoids stalls in the cases in which a previously decoded but not yet executed instruction may change the value of the register. In an unusual case of "intra-instruction register read conflict," however, the GP unit will obtain the contents of a register specified by a register operand and place the contents in the source list. This occurs when the instruction decoder 20 detects the conflict and sends a signal to a microsequencer 63 that is preprogrammed to override the normal operation of the GP unit to handle the conflict. The microsequencer is also programmed to keep the instruction unit's copy of the general purpose registers in agreement with the general purpose registers in the execution unit. These aspects of the operand processing unit are described in the above referenced D. Fite et al. U.S. patent application entitled "Decoding Multiple Specifiers In A Variable Length Instruction Architecture."

For passing register pointers to the execution unit when register specifiers are decoded, the instruction decoder has a TR bus extending to a transfer unit 64 in the operand processing unit. The TR unit is essentially a pair of latches making up a "stall buffer" for holding up to three register pointers in the event of a stall condition such as the queues 23 becoming full. A specific circuit for a "stall buffer" is shown in the above referenced Murray et al. U.S. patent application entitled "Multiple Instruction Processing System With Data Dependency Resolution For Digital Computers."

Figure 6:
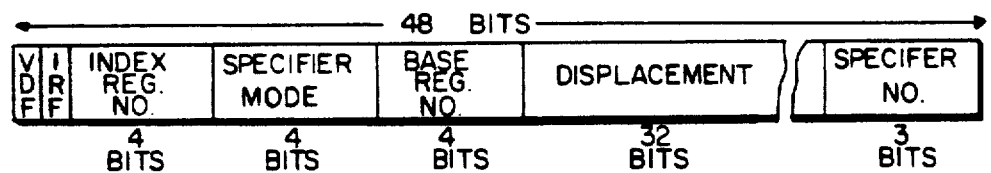
FIG. 6 is a diagram showing the format of operand specifier data transferred over a GP bus from an instruction decoder to a general purpose unit in an operand processing unit in the instruction unit.

Turning now to FIG. 6, the format for the GP bus is shown in greater detail. The GP bus transmits a single bit "valid data flag" (VDF) to indicate to the general purpose unit 62 whether a complex specifier has been decoded during the previous cycle of the system clock. A single bit "index register flag" (IRF) is also transmitted to indicate whether the complex specifier references an index register. Any referenced index register is designated by a four-bit index register number transmitted over the GP bus. The GP bus also conveys four bits indicating the specifier mode of the complex specifier, four bits indicating the base register number, and thirty-two bits including any displacement specified by the complex specifier.

The GP bus also transmits a three-bit specifier number indicating the position of the complex specifier in the sequence of the specifiers for the current instruction. The specifier number permits the general purpose unit 62 to select access and data type for the specified operand from a decode of the opcode byte. Therefore, it is possible for the general purpose unit 62 to operate somewhat independently of the expansion unit 61 and transfer unit 64 of FIG. 5. In particular, the general purpose unit 62 provides an independent stall signal (OPU_STALL) which indicates whether the general purpose unit 62 requires more than one cycle to determine the operand.

Figure 7:
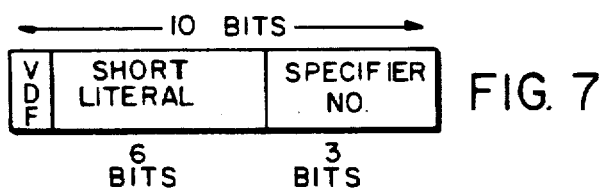
FIG. 7 is a diagram showing the format of short literal specifier data transferred over a SL bus from the instruction decoder to an expansion unit in the operand processing unit.

Turning now to FIG. 7, there is shown the format for the expansion bus (EX). The expansion bus conveys a single bit valid data flag, the six bits of the short literal data, and a three-bit specifier number. The specifier number indicates the position of the short literal specifier in the sequence of specifiers following the current instruction, and is used by the expansion unit 61 to select the relevant datatype from a decode of the opcode byte. Therefore, the expansion unit 61 may also operate rather independently and provides a respective stall signal ($SL_{13}$ STALL) which indicates whether the expansion unit requires more than one cycle to process a short literal specifier.

Figure 8:
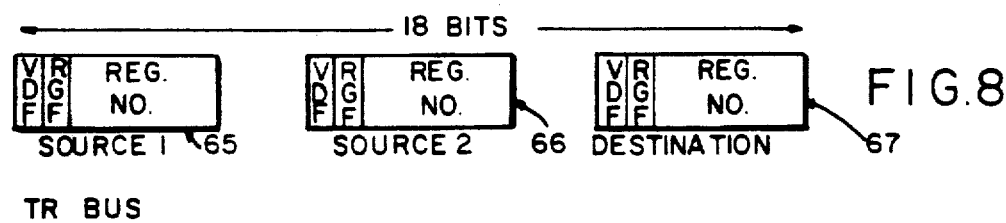
FIG. 8 is a diagram showing the format of source and destination specifier data transmitted over a TR bus from the instruction decoder to a transfer unit in the operand processing unit.

Turning now to FIG. 8, there is shown the format for the transfer bus (TR). The TR bus includes a first source bus 65, a second source bus 66 and a destination bus 67, each of which conveys a respective valid data flag (VDF), a register flag (RGF) and a register number. The register flag is set when a corresponding register specifier has been decoded. Also, whenever a complex or short literal specifier is decoded, then a respective one of the valid data flags in the first source, second source or destination buses is set and the associated register flag is cleared in order to reserve a space in the data path to the source list pointer queue or the destination queue for the source or destination operand.

An entry in the source pointer queue has a format that is the same as the source 1 bus 65 (which is the same as the source 2 bus 66.) Whenever a valid source 1 specifier is not a register, it is a memory source. When a valid source 1 pointer is a memory source, the next free source list location pointer replaces the register number. Similarly, whenever a valid source 2 specifier is not a register, it is a memory source. When a valid source 2 pointer is a memory source, the next free source list location pointer replaces the register number. Each valid pointer is loaded into, and will occupy, one entry in the source pointer queue. As many as two pointers may be loaded simultaneously. If one pointer is to be loaded, it must be the source 1 pointer. If two source pointers are loaded at once, the source 1 pointer will occupy the location in the queue ahead of the location for the source 2 pointer. This assures that the execution unit will use the source pointers in the same order as the source specifiers appeared in the instruction. If there is not enough free space available for data in the source list, then no source pointers are loaded. Also, no source pointers are loaded in the source pointer queue 23c would overflow. For generating the next free source list pointers in accordance with these considerations, there is provided free pointer logic 68 in the operand processing unit 21 (see FIG. 5) together with a set of multiplexers 69 which insert the free pointers into the respective invalid register numbers as required by the presence of valid non-register specifiers and in the absence of the overflow conditions.

Preferably the only part of the destination pointer used for non-register destination specifiers (i.e., complex specifiers because a literal specifier will not be decoded as a valid destination) is the valid data flag. In other words, some other mechanism is used for pointing to the destination addresses of memory write specifiers. The preferred mechanism is a "write queue" 70 (see FIG. 1) in the memory access unit for queuing the physical addresses of the memory write specifiers. Therefore, when the GP unit calculates the address of a destination location, the GP unit transmits it to the memory access unit along with a code identifying it as a destination address to be stored in the write queue until the corresponding result is retired to memory by the retire unit 27 of the execution unit 13. Since the retire unit retires results in the same sequence in which they are decoded, the respective address for each result is removed from the head of the write queue when the result is retired to the memory access unit. Further aspects of the write queue 70 are disclosed in the above referenced D. Fite et al. U.S patent application Ser. No. 07/306,767, filed Feb. 3, 1989, and entitled "Method and Apparatus For Resolving A Variable Number Of Potential Memory Access Conflicts In A Pipelined Computer System," which is incorporated herein by reference.

Figure 9:
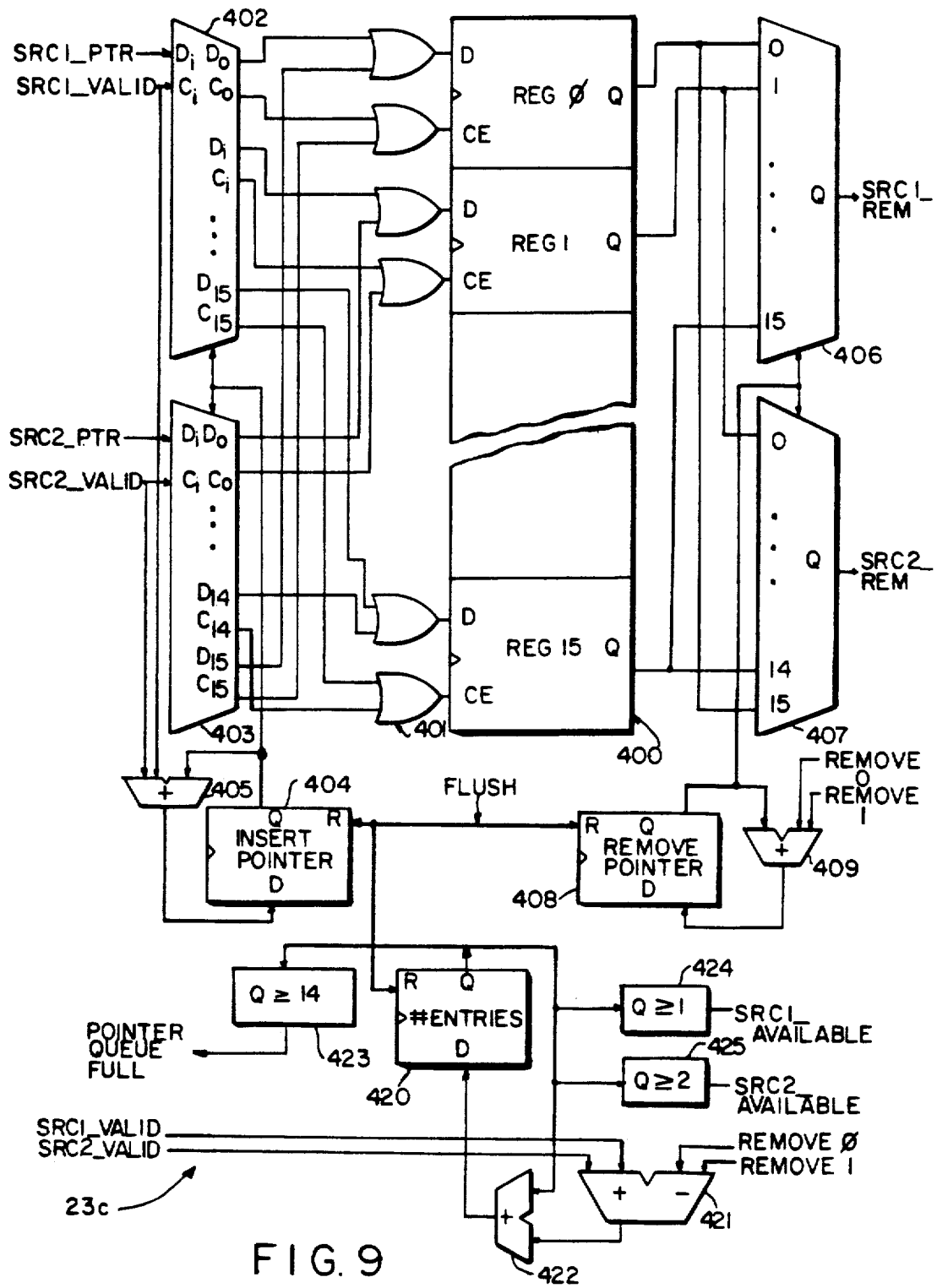
FIG. 9 is a schematic diagram of the source pointer queue.

Turning now to FIG. 9, there is shown a schematic diagram of the source pointer queue 23c. The source pointer queue includes a set 400 of sixteen five-bit registers, each of which may hold a four-bit pointer and a flag indicating whether the pointer points to a general purpose register or an entry in the source list (24 in FIG. 1). In comparison, the program counter queue 23a and the fork queu 23b each have eight registers.

To simultaneously insert two source pointers, the registers 400 each have data and clock enable inputs connected to respective OR gates 401 which combine the outputs of two demultiplexers 402, 403 which direct a SRC1_PTR and a SRC2_PTR and associated SRC1_VALID and SRC2_VALID signals to the next two free registers, as selected by an insert pointer from an insert pointer register 404. The insert pointer is incremented by 0, 1 or 2 depending on whether none, one or two of the SRC1_VALID and SRC2_VALID signals are asserted, as computed by an adder 405.

To simultaneously remove up to two pointers, the source pointer queue 23c includes first and second multiplexers 406, 407 that are controlled by a remove printer register 408 that is incremented by zero, one or two by an adder 409 depending upon the respective pointers requested by the REMOVE_0 and REMOVE_1 signals.

To determine the number of entries currently in the source pointer queue, a register 420 is reset to zero when the source pointer queue 23c is flushed by resetting the insert pointer register 404 and the remove pointer register 408. Subtracter and adder circuits 421 and 422 increment or decrement the register 420 in response to the net number of pointers inserted or removed from the queue 23c. Essentially the number of entries in the queue is the difference between the insert pointer and the remove pointer, although the register 420 for the number of pointers currently in the queue also provides an indication of whether the queue is completely empty or entirely full. Due to delay in transmitting a POINTER_QUEUE_FULL signal from the source pointer queue to the instruction unit such a POINTER_QUEUE_FULL signal is preferably generated when the number of entries in the queue reaches 14, instead of the maximum number of 16, as determined by a decoder circuit 423. In a similar fashion, decoders 424 and 425 provide an indication of whether first and second source pointers are available from the queue.

Figure 10:
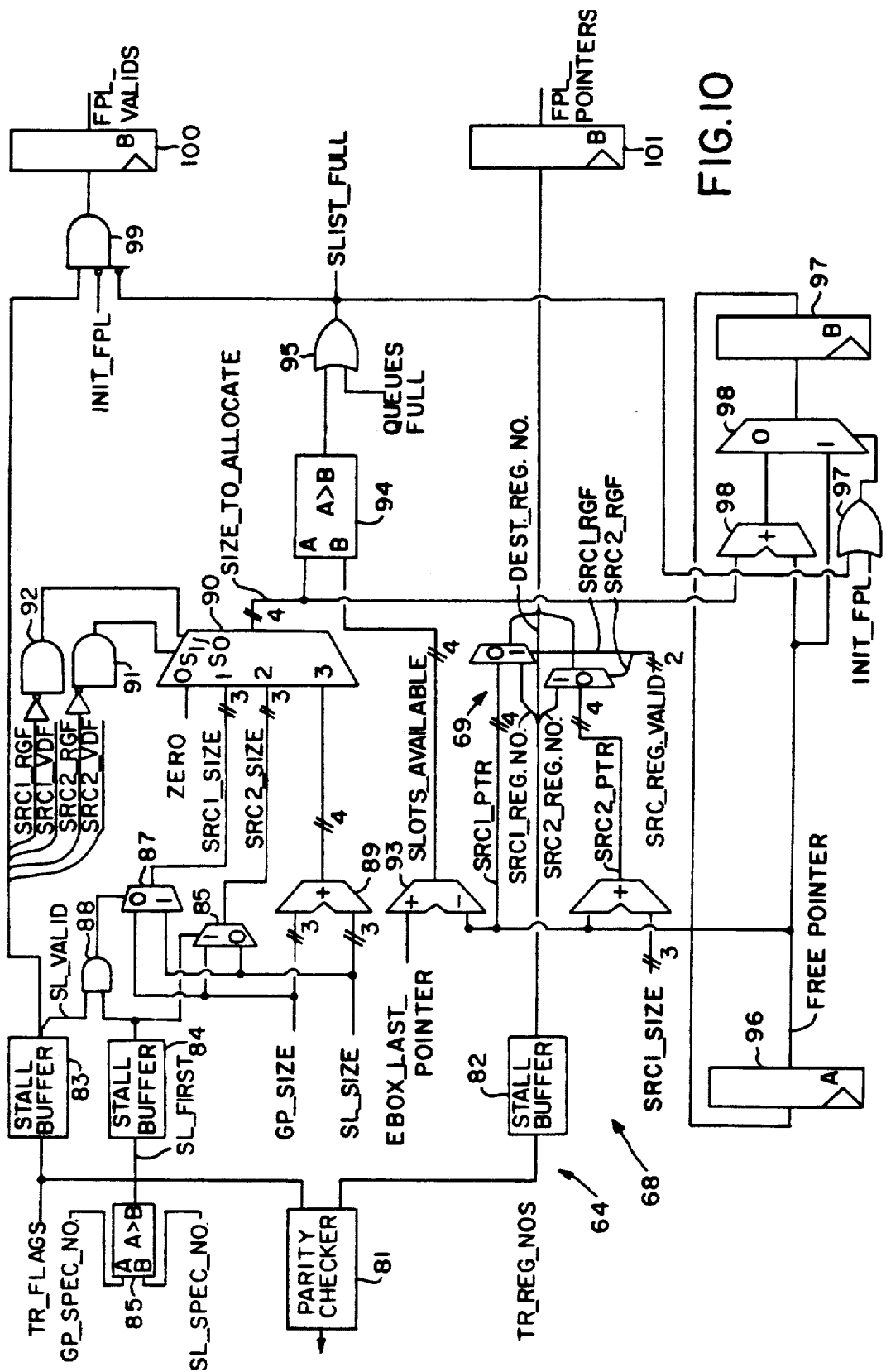
FIG. 10 is a schematic diagram of the transfer unit.

Turning now to FIG. 10, there is shown a schematic diagram of the transfer unit generally designated 64, the free pointer logic generally designated 68, and the set of multiplexers generally designated 69. The transfer unit 64 includes a parity checker 81 for returning any parity error back to the instruction decoder (20 in FIG. 5) and stall buffers 82 and 83 for buffering the transfer bus register numbers and flags, respectively. The free pointer logic also includes a stall buffer 84 for buffering in a similar fashion a signal SL_FIRST, which indicates whether, in the case of first and second valid non-register specifiers, the short literal comes before the complex specifier. This signal can be provided by a comparator 85 which compares the specifier number of the complex specifier to the specifier number of the short literal specifier. The buffered signal SL_FIRST, is use as the select to a first multiplexer 86, and also a second multiplexer 87 after qualification by the buffered SL_VALID signal in an AND gate 88, in order to determine the size of the first and second specifiers from the sizes of the complex and short literal specifiers. The sizes of the complex and short literal specifiers are obtained from a decoder (not shown) responsive to the opcode and the respective specifier numbers of the complex and short literal specifier. An adder 89 computes the total size, or number of entries in the source list for storing both the complex source operand and the expanded short literal operand.

The number of entries needed to store the valid non-complex specifiers in the source list is selected by a multiplexer 90. The select lines of the multiplexer 90 indicate whether the second and first specifiers are valid non register specifiers respectively, as detected by AND gates 91 and 92 from the valid data flags and the register flags for the second source and the first source.

In order to determine whether an overflow condition will occur if any valid non register specifiers are stored in the source list, a subtracter 93 compares the position of the head of the queue, as indicated by the value EBOX_LAST_POINTER, pointing to the value of the next FREE POINTER. A comparator 94 detects the potential overflow condition when the size to allocate exceeds the number of slots available. The signal from the comparator 94 is combined with a QUEUES FULL signal in an OR gate 95 to obtain a signal indicating that the source list is full or the source pointer queue is full.

The free pointer is kept current in an accumulator including a pair of latches 96 and 97 activated by non-overlapping A and B clocks, and an adder 98. The free pointer, however, is not incremented by the SIZE_TO_ALLOCATE in the event of the source list becoming full or during an initialization cycle. An OR gate 97 and a multiplexer 98 insure that the free pointer does not change its value under these conditions. During a flush, for example, the INIT_FPL signal is asserted and the EBOX_LAST_POINTER signal is set equal to the value of the FREE_POINTER signal. The EBOX_LAST_POINTER signal is provided by a counter (not shown) in the execution unit.

In the event that the queues are too full to allocate sufficient size in the source list for the current valid non-register specifiers, then the transfer unit must stall. In this case the valid flags are set to unasserted values by a gate 99. The gate 99 also sets the flags to their unasserted state during an initialization cycle when the INIT_FPL signal is asserted. The valid flags are transmitted to the source pointer queue through an output latch 100. In a similar fashion, the two source pointers and the destination pointer from the set of multiplexers 69 are transmitted through an output latch 101.

Figure 11:
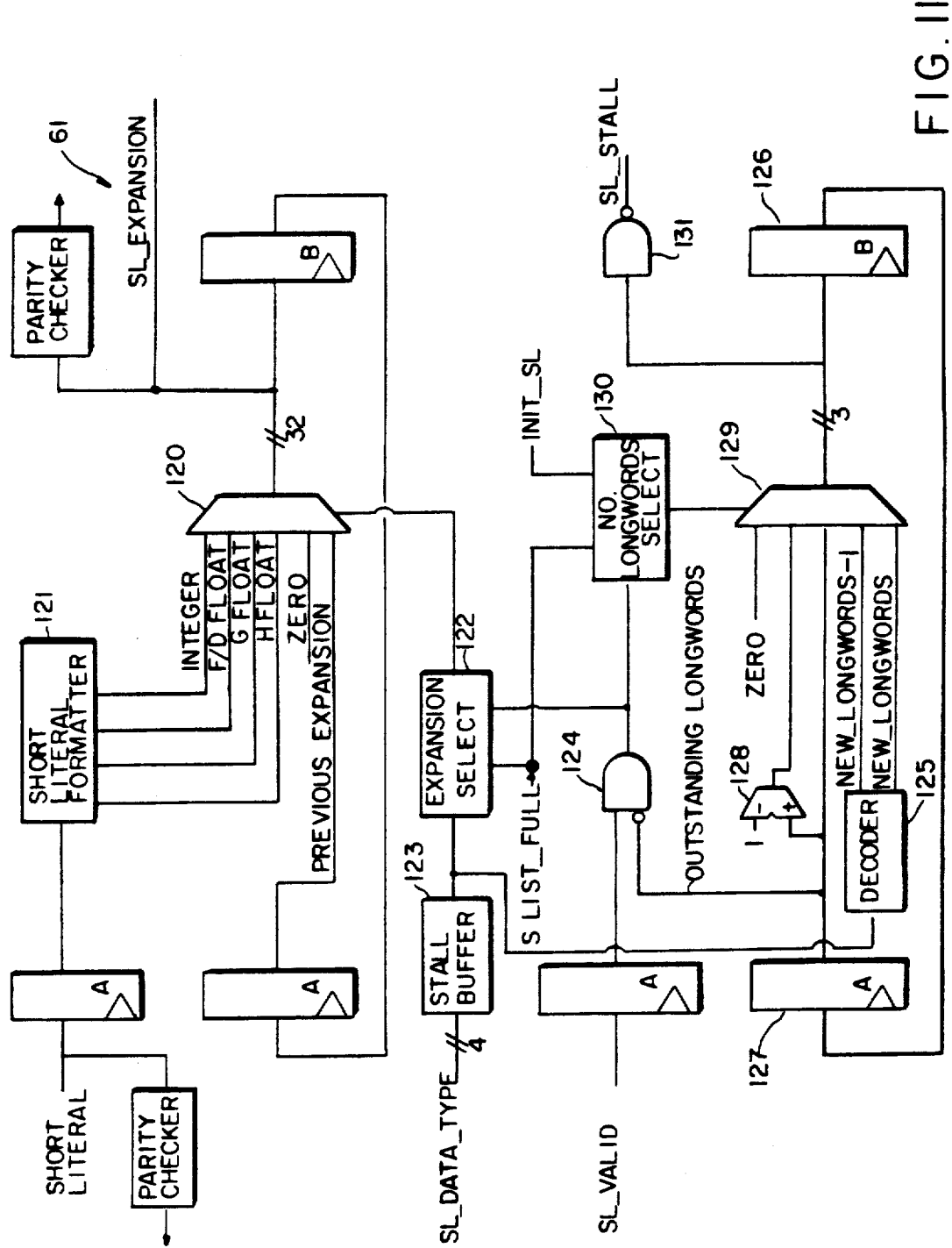
FIG. 11 is a schematic diagram of the expansion unit.

Turning now to FIG. 11, there is shown a schematic diagram of the expansion unit generally designated 61. The expansion unit takes the decoded short literals from the instruction decoder and expands them for insertion into the 36-bit entries of the source list. The actual expansion performed depends on the data type of the specifier. In particular, a multiplexer 120 selects either an integer, F and D floating point, G floating point, or H floating format depending on the datatype of the specifier. At least for the first data word, the format is provided by combinational logic 121 known as a short literal formatter. For data types requiring additional 32-bit data words, the additional words are filled with zeros.

During a stall, the multiplexer 120 also selects the previous expansion to hold its state. The select lines of the multiplexer 120 are provided by an expansion select decoder 122 responsive to the short literal data type which is held in a stall buffer 123 during stalls. The expansion select decoder is also responsive to whether the first or some other long word of the expansion is currently being generated. This condition is provided by a gate 124 that detects whether the number of outstanding long words is different from zero. The number of long words required for the expansion is provided by a decoder 125 responsive to the data type of the short literal. The required number of long words is counted down by an accumulator including a pair of latches 126, 127 and decrement logic 128. The accumulator includes a multiplexer 129 for initialing setting the accumulator, clearing the accumulator, or holding its value in the event of a stall. The next state of the accumulator is selected by combinational logic 130. A gate 131 generates a short literal stall signal whenever the expansion must continue during the next cycle, as indicated by the next state of the accumulator. In other words, the stall signal is asserted unless the outstanding number of long words is zero.

Figure 12:
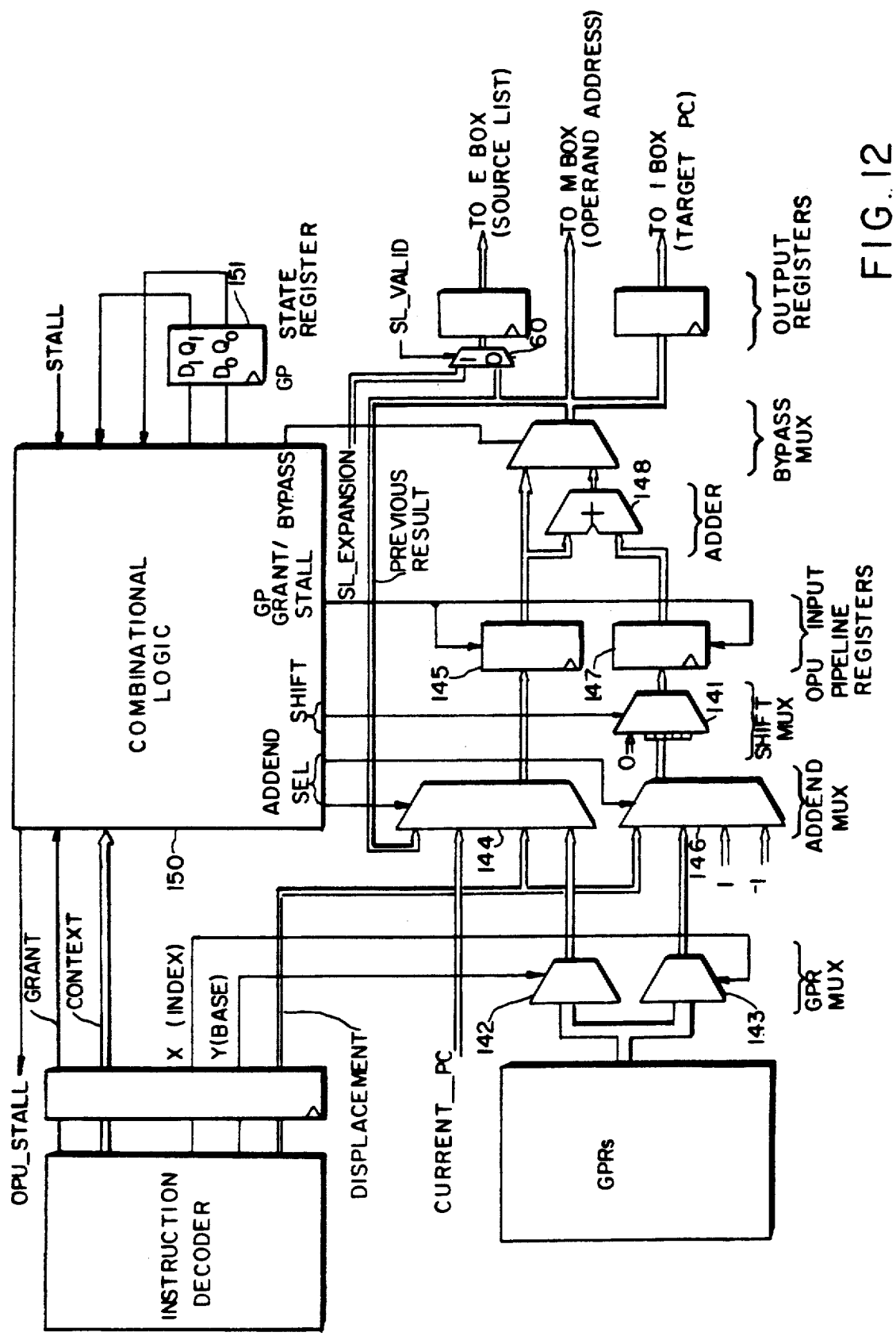
FIG. 12 is a schematic diagram of the general purpose unit in the operand processing unit.

Turning now to FIG. 12 there is shown a schematic diagram of the general purpose (GP) unit. The general purpose unit needs two cycles for the computation of a memory address specified by index (X), base (Y) and displacement (D) specifiers. In the first cycle, the contends of the base register are added to the displacement. In the second cycle, the contents of the index register are shifted by 0, 1, 2 or 3 bit positions depending upon whether the indexing operation is for a byte, word, long word or quad word context, respectively and added to the previous result. This shifting is performed by a shift multiplexer 141. The value of the base register is selected by a multiplexer 142, and the value of the base register is selected by a multiplexer 143. In the first cycle, the content of the selected base register is fed through another multiplexer 144 to an intermediate pipeline or stall register 145, and similarly the displacement is selected by still another multiplexer 146 and after a shift of 0 positions, and after being transferred through the shift multiplexer 141 is received in a second intermediate pipeline or stall register 147. The base and displacement are then added in an adder 148 and the sum is fed back through the multiplexer 144 to the pipeline register 145. At this time the multiplexer 146 selects the index register value instead of the displacement, the shifter 141 shifts the value of the index register in accordance with the context of the indexing operation, and the shifted value is stored in the second intermediate pipeline register 147. During the computational cycle, the adder 148 adds together the contents of the two pipeline registers 145 and 147.

The GP unit is controlled by a sequential state machine including combinational logic 150 and a two-bit state register 151 defining four distinct states. It cycles back to state zero after completion of the operand processing an instruction. When given a grant signal from the instruction decoder and so long as a stall condition is absent, the GP unit may issue a memory access request and cycle through its states until completion of the operand processing for the instruction. Aside from the grant and stall signals, which could be thought of inhibiting the counting of the state register 151 and the request or transmission of data by the GP unit, the combinational logic 150 can be defined by a state table having nine input bits, consisting of four bits which define combinations of the specifier mode, three bits which specify the specifier access type, and the two bits from the state register 151. The four bits defining the combinations of the specifier mode ($D_4$, $D_3$, $D_2$, $D_1$) are obtained from the five bits (PC, M4, M3, M2, M1) which define the specifier modes according to: $D_4 = PC$, $D_3 = NOT(M4)$, $D_2 = (M4\ AND\ M3)\ OR\ M2$, and $D_1 = M1$. Therefore the four bits (D4, D3, D2, D1) are related to the specifier modes as shown in the following Table I:

TABLE I

| PC | M4 | M3 | M2 | M1 | D4 | D3 | D2 | D1 | |
|----|----|----|----|----|----|----|----|----|---|
|    |    |    |    |    |    |    |    |    | ; ******** non-PC modes ***** |
| 0  | 0  | 0  | 0  | 0  | d  | d  | d  | d  | ; slit - OPU doesn't handle |
| 0  | 0  | 0  | 0  | 1  | d  | d  | d  | d  | ; slit - OPU doesn't handle |
| 0  | 0  | 0  | 1  | 0  | d  | d  | d  | d  | ; slit - OPU doesn't handle |
| 0  | 0  | 0  | 1  | 1  | d  | d  | d  | d  | ; slit - OPU doesn't handle |
| 0  | 0  | 1  | 0  | 0  | d  | d  | d  | d  | ; indexed - not by itself! |
| 0  | 0  | 1  | 0  | 1  | 0  | 1  | 0  | 1  | ; register |
| 0  | 0  | 1  | 1  | 0  | 0  | 1  | 1  | 0  | ; register deferred |
| 0  | 0  | 1  | 1  | 1  | 0  | 1  | 1  | 1  | ; autodecrement |
| 0  | 1  | 0  | 0  | 0  | 0  | 0  | 0  | 0  | ; autoincrement |
| 0  | 1  | 0  | 0  | 1  | 0  | 0  | 0  | 1  | ; autoinc deferred |
| 0  | 1  | 0  | 1  | 0  | 0  | 0  | 1  | 0  | ; byte disp → disp |
| 0  | 1  | 0  | 1  | 1  | 0  | 0  | 1  | 1  | ; byte disp def → disp def |
| 0  | 1  | 1  | 0  | 0  | 0  | 0  | 1  | 0  | ; word disp → disp |
| 0  | 1  | 1  | 0  | 1  | 0  | 0  | 1  | 1  | ; word disp def → disp def |
| 0  | 1  | 1  | 1  | 0  | 0  | 0  | 1  | 0  | ; lword disp → disp |
| 0  | 1  | 1  | 1  | 1  | 0  | 0  | 1  | 1  | ; lword disp def → disp def |
|    |    |    |    |    |    |    |    |    | ; ********** PC modes ******* |
| 1  | 0  | 0  | 0  | 0  | d  | d  | d  | d  | ; slit - OPU doesn't handle |
| 1  | 0  | 0  | 0  | 1  | d  | d  | d  | d  | ; slit - OPU doesn't handle |
| 1  | 0  | 0  | 1  | 0  | d  | d  | d  | d  | ; slit - OPU doesn't handle |

TABLE I-continued

| PC | M4 | M3 | M2 | M1 | D4 | D3 | D2 | D1 | |
|----|----|----|----|----|----|----|----|----|--|
| 1 | 0 | 0 | 1 | 1 | d | d | d | d | ; slit - OPU doesn't handle |
| 1 | 0 | 1 | 0 | 0 | d | d | d | d | ; indexed - not by itself! |
| 1 | 0 | 1 | 0 | 1 | 1 | 1 | 0 | 1 | ; PC as Rn → UNPREDICTABLE |
| 1 | 0 | 1 | 1 | 0 | 1 | 1 | 1 | 0 | ; PC as (Rn) → UNPREDICTABLE |
| 1 | 0 | 1 | 1 | 1 | 1 | 1 | 1 | 1 | ; PC as -(Rn) → UNPRED. |
| 1 | 1 | 0 | 0 | 0 | 1 | 0 | 0 | 0 | ; immediate |
| 1 | 1 | 0 | 0 | 1 | 1 | 0 | 0 | 1 | ; absolute |
| 1 | 1 | 0 | 1 | 0 | 1 | 0 | 1 | 0 | ; byte relative → relative |
| 1 | 1 | 0 | 1 | 1 | 1 | 0 | 1 | 1 | ; byte rel def → rel def |
| 1 | 1 | 1 | 0 | 0 | 1 | 0 | 1 | 0 | ; word relative → relative |
| 1 | 1 | 1 | 0 | 1 | 1 | 0 | 1 | 1 | ; word rel def → rel def |
| 1 | 1 | 1 | 1 | 0 | 1 | 0 | 1 | 0 | ; lword relative → relative |
| 1 | 1 | 1 | 1 | 1 | 1 | 0 | 1 | 1 | ; lword rel def → rel def |

With this implementation the preferred combinational logic 150 is defined by the following state sequences in Table II:

TABLE II

| Specifier Mode | Specifier Access Type | | | |
|---|---|---|---|---|
| | Read/Write/Modify | Asrc | Vsrc | Callx |
| Rn | \|S\|S\|S\|S\| | \|[no ucode] | \|S\|S\| | \|[no ucode] |
| (Rn) | \|R\| | \|SP\| | \|SR\| | \|RP\| |
| (PC) | \|R\| | \|SP\| | \|SR\| | \|RP\| |
| (Rn) [Rx] | \|R\| | \|SP\| | \|SR\| | \|R\|P\| |
| (PC) [Rx] | \|R\| | \|SP\| | \|SR\| | \|R\|P\| |
| -(Rn) | \|RG\| | \|SGP\| | \|SGR\| | \|RG\|P\| |
| -(PC) | \|R\| | \|SP\| | \|SR\| | \|R\|P\| |
| -(Rn) [Rx] | \|G\|R\| | \|G\|SP\| | \|G\|SR\| | \|G\|R\|P\| |
| -(PC) [Rx] | \|C\|R\| | \|C\|SP\| | \|C\|SR\| | \|C\|R\|P\| |
| (Rn)+ | \|RG\| | \|SP\|G\| | \|SR\|G\| | \|RP\|G\| |
| (PC)+ | \|R\| | \|SP\| | \|SR\| | \|R\|P\| |
| Rn+[Rx] | \|R\|G\| | \|SP\|G\| | \|SR\|G\| | \|R\|P\|G\| |
| (PC)+[Rx] | \|C\|R\| | \|C\|SP\| | \|C\|SR\| | \|C\|R\|P\| |
| @ (Rn)+ | \|RG\|—\|—\|R\| | \|RG\|—\|—\|SP\| | \|GR\|—\|—\|SR\| | \|RG\|—\|—\|RP\| |
| @ (PC)+ | \|R\| | \|SP\| | \|SR\| | \|RP\| |
| @ (Rn)+[Rx] | \|RG\|—\|—\|R\| | \|RG\|—\|—\|SP\| | \|GR\|—\|—\|SR\| | \|RG\|—\|—\|R\|P\| |
| @ (PC)+[Rx] | \|R\| | \|SP\| | \|SR\| | \|R\|P\| |
| D (Rn) | \|R\| | \|SP\| | \|SR\| | \|R\|P\| |
| D (PC) | \|R\| | \|SP\| | \|SR\| | \|R\|P\| |
| D (Rn) [Rx] | \|C\|R\| | \|C\|SP\| | \|C\|SR\| | \|C\|R\|P\| |
| D (PC) [Rx] | \|C\|R\| | \|C\|SP\| | \|C\|SR\| | \|C\|R\|P\| |
| @D (Rn) | \|R\|—\|—\|R\| | \|R\|—\|—\|SP\| | \|R\|—\|—\|SR\| | \|R\|—\|—\|RP\| |
| @D (PC) | \|R\|—\|—\|R\| | \|R\|—\|—\|SP\| | \|R\|—\|—\|SR\| | \|R\|—\|—\|RP\| |
| @D (Rn) [Rx] | \|R\|—\|—\|R\| | \|R\|—\|—\|SP\| | \|R\|—\|—\|SR\| | \|R\|—\|—\|R\|P\| |
| @D (PC) [Rx] | \|R\|—\|—\|R\| | \|R\|—\|—\|SP\| | \|R\|—\|—\|SR\| | \|R\|—\|—\|R\|P\| |

Key:
S — write to EBOX source list
R — issue MBOX OP port request
G — write to IBOX and EBOX GPRs
P — issue target PC to IBOX's PC unit
C — OPU computation cycle
'—' indicates a guaranteed stall cycle ...

It should be noted that from the above Table II, the sequence of operations selected by the combinational logic 150 depends upon the specifier mode and the specifier access type. For the intersection of any specifier mode and any specifier access type in the table, it can be seen that there is a sequence of up to no more than three operations although there could be up to two guaranteed stall cycles. Therefore, state zero of the state register 151 can define the idle state of the machine, and states 1, 2 and 3 can define the sequence of the 3 states in which the machine is actually performing an operation.

Figure 13:
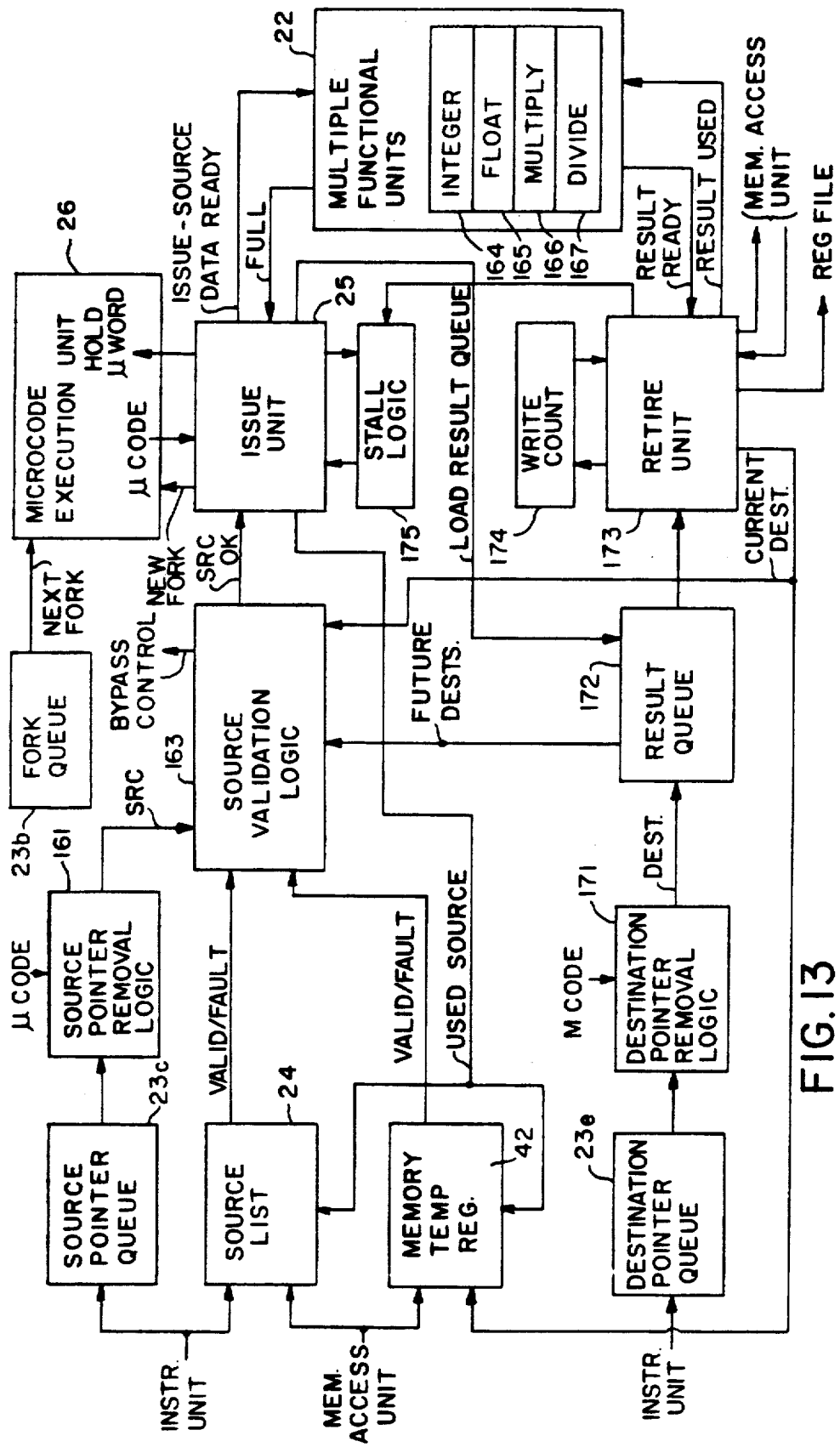
FIG. 13 is a block diagram of the execution unit, which shows the control flow for executing instructions and retiring results.

Referring now to FIG. 13, there is shown a block diagram of the execution unit which shows the flow of control signals between the various components in the execution unit. Assume, for example, that the execution has been initialized so that it is in an idle state. Even during this idle state, the execution unit is looking for valid source operands as indicated by valid data flags at the head of the source pointer queue. The microcode enables the source pointer removal logic 161 to pass the source pointers at the head of the queue to source validation logic 163. In the event of the source pointers indicating the presence of a valid non register source specifier, the source validation logic 163 checks the states of respective valid bits associated with the entries in the source list pointed to by the source pointers. In the event that the valid bit is asserted, the source validation logic 163 asserts a SRC_OK signal to the issue unit 25, which is under the control of the microcode execution unit 26.

When the issue unit 25 determines that there is a next fork at the head of the fork queue, it issues a new fork signal to the microcode execution unit 26. The microcode execution unit thereby responds by returning the microcode word at that fork address. The first word, for example, instructs the issue unit to transmit the validated source data from the source list in the case of a valid non-register specifier, or from the specified general purpose register or registers. The microcode word, for example, specifies the particular one of the multiple functional units to receive the source data. The multiple functional units include, for example, an integer unit 164, a floating point unit 165, a multiply unit 166, and a divide unit 167.

The integer unit, for example, has a 32 bit arithmetic logic unit, a 64 bit barrel shifter, and an address generation unit for producing a memory address every cycle, and therefore executes simple instructions such as a move long, or add long, at a rate of 1 per cycle and with little microcode control. Complex instructions such as CALLS, and MOVC are done by repeated passes through the data path of the integer unit. For these instructions, the microcode controls access to the data path resources in the execution unit. Due to the use of multiple functional units, a single integer unit is sufficient to keep up with the peak flow of the integer instructions. Complex instructions, for example, do not lend themselves to concurrency due to the memory interactions inherent in string manipulations and stack frames. While microcode executes these instructions, other functional units would be idle.

The floating point unit 165 executes floating point operations such as ADD, SUB, CMP, CVT, and MOV for F, G and D floating formats. It is pipelined, so it can accept instructions as fast as the issue unit can issue and retire them. Although it gets the source operands in 32-bit pieces, it has a 64 bit data path internally. The floating point unit is further described in the above referenced Fossum et al., U.S. Patent Application entitled "Pipelined Floating Point Adder For Digital Computer."

The multiplier 166 is preferably a pipelined multiplier that performs both integer and floating point multiplications.

The divider 167 does division for both integer and floating point, and is not pipelined to save logic and because it is sufficiently fast. The divider, for example, does a division in twelve cycles, even for D and G floating point formats.

For the instruction having been issued, it is assumed that the operation requires a destination for retiring the result. Moreover, it is possible that the destination pointer for the result will be inserted in the destination pointer queue 23e some time after the source specifiers are validated. When a destination is expected, the microcode enables destination pointer removal logic 171 to remove the destination pointer from the head of the destination pointer queue and to insert the destination pointer into a result queue 172, along with information identifying a particular one of the multiple function units 22 that is to provide the result. It is also possible that the issue unit may have issued an instruction that does not have an explicit destination specified in the instruction. The instruction, for example, may require the use of the execution temporary registers (43 in FIG. 4). In this case, some or possibly all of the destinations for the instruction could be known to the microcode execution unit 26. Therefore, in this case the issue unit 25 could load the result queue at the very beginning of execution of the instruction.

As noted above, the execution unit is designed to retire the results of instructions in the same sequence in which the instructions appear in the instruction stream. The same would be true for intermediate operations by microwords making up the macro instructions in the instruction stream. Therefore, in addition to the advantage that memory write results can be retired at memory addresses specified in the write queue it is also possible to use a result queue 172 to alleviate the issue unit of the burden of keeping track of when the multiple functional units actually complete their processing. Instead, the task of retiring the results can be delegated to a separate retire unit 173.

The retire unit 173 monitors the destination information at the head of the result queue, and in particular monitors the result ready signal selected from the particular functional unit indicated by the functional unit specification in the entry at the head of the result queue. Upon receipt of that result ready signal, the retire unit can retire the result in the fashion indicated by the information in that head entry in the result queue.

In addition to the actual location normally intended for the result, the retire unit may check condition codes, such as underflow or overflow, associated with the result and depending upon the condition codes, set trap enable flags to cause the microcode execution unit to handle the trap. For memory destinations, the retire unit ensures that the result is sent to the memory unit. For results including multiple 32-bit longwords, for example, the retire unit maintains a count in a register 174 to ensure that the entire result is retired before it goes on to retire any next result at the head of the result queue. Also, if the retire unit encounters any difficulty in retiring results, it could, for example, enable stall logic 175 associated with the issue unit to perform a stall, trap, or exception in order to correct the problem.

Figure 14:
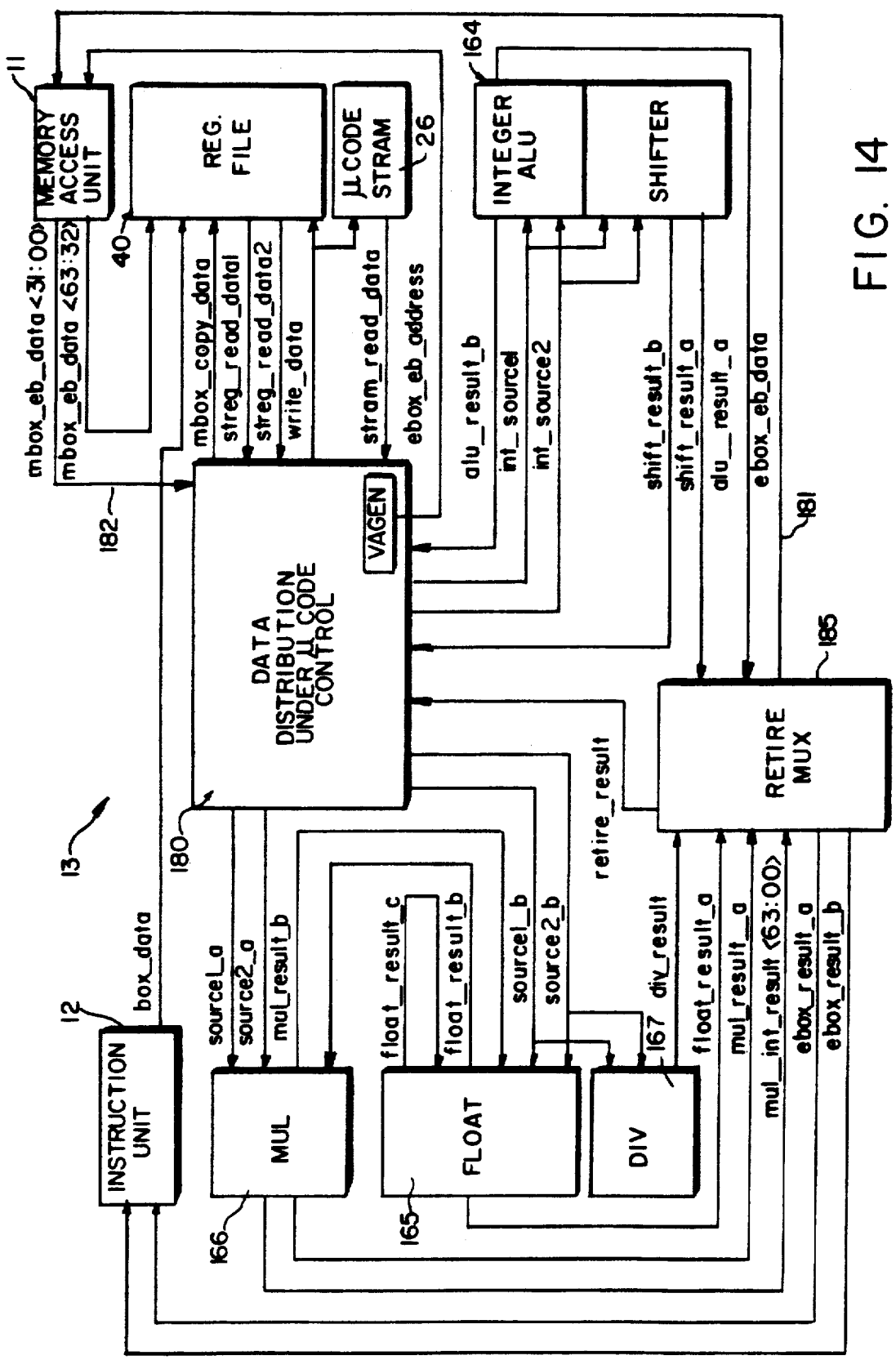
FIG. 14 is a block diagram of the execution unit, which shows the data paths available for use during the execution of instructions and the retiring of results.

Turning now to FIG. 14, there is shown a block diagram of the preferred data paths in the execution unit 13. Each functional unit has a data path for retiring results that terminates at the retire unit. The result from the functional unit indicated by the result queue entry at the head of the queue is called "RETIRE_RESULT" which is selected by a retire multiplexer 185. The RETIRE_RESULT is fed to a central data distribution network generally designated 180. The retire unit 27 also has a pair of data paths for sending results to the copy of the register file in the instruction unit 12 and to the program counter (17 in FIG. 1) in instruction unit for flushes. The retire unit also has a data path directly to the memory access unit 11. However, when the execution unit receives data from the memory access unit 11, the data are always transferred from the memory access unit to one of the sixteen memory temporary locations or one of the sixteen source list locations in the register file 40. This is true even if the data are immediately used by the execution unit as soon as it is available from the bus 182 between the memory access unit 11 and the execution unit 13. In other words, even if a bypass gate is enabled to get the data from the buss 182, the data are written into the register file 40. When the execution unit does a memory read, it first invalidates a specified location in the memory temporaries in the register file 40 by clearing a respective "valid data bit", then requests the memory access unit to fetch data from a specified address and transmit it to the specified memory temporary location, and finally waits for the respective valid data bit to become set. The memory access unit writes to the respective "valid data bit" to set it when it transmits fetched data to a specified memory temporary location. The "system reset" clears or invalidates all of the "valid data bits" in the memory temporary registers.

Figure 15:
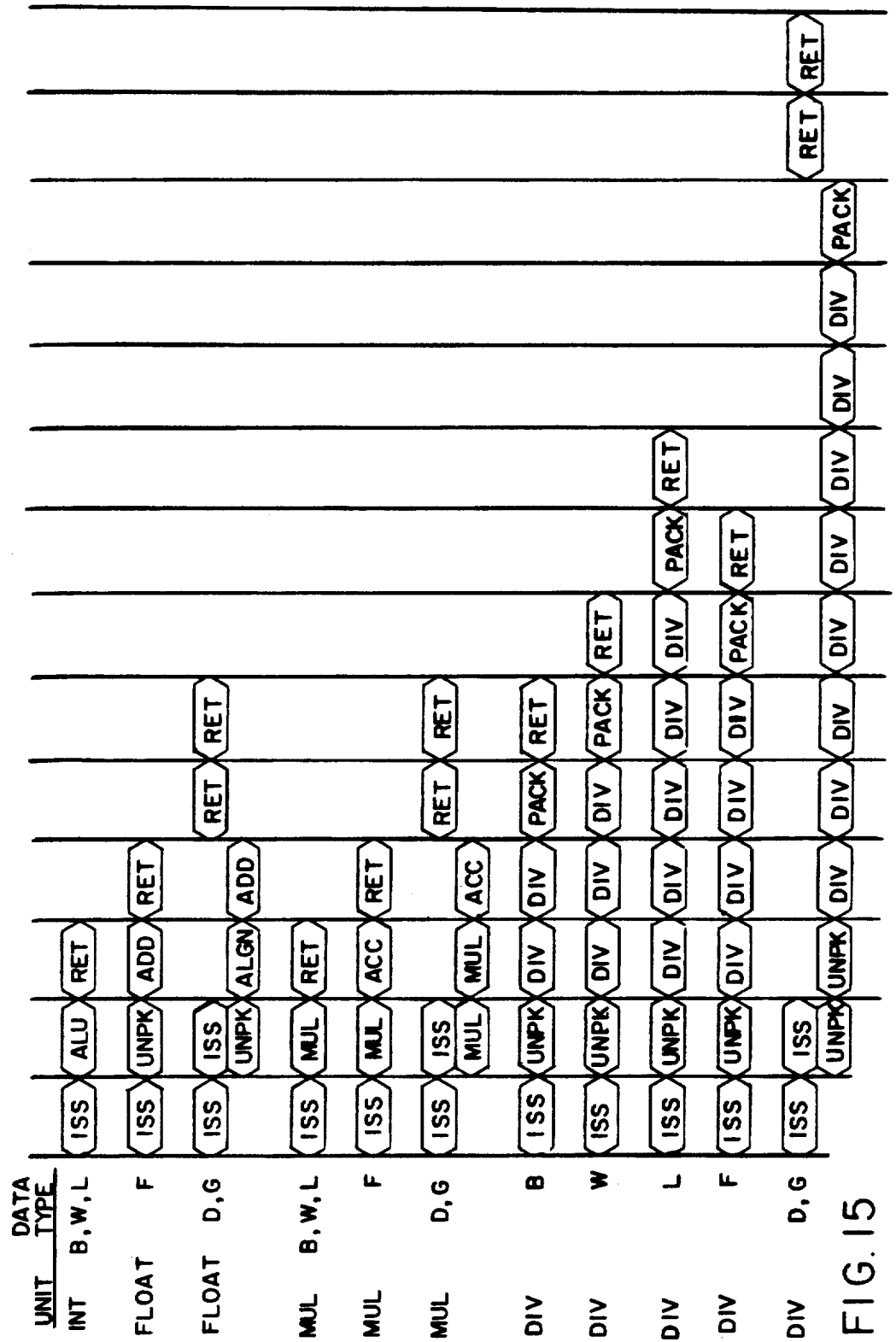
FIG. 15 is a timing diagram showing the states of respective functional units when performing their respective arithmetic or logical operations upon source operands of various data types.

Turning now to FIG. 15, there is shown a timing diagram of the states of the various functional units for executing some common instructions. The fact that these instructions require various numbers of cycles to complete, and also due to the fact that they require different numbers of retire cycles, all indicate that the use of the result queue and the retire unit relieves the microcode and issue logic of a substantial burden of waiting for the results to retire and retiring them accordingly. The advantage is even more significant when one considers the interruption of the normal processing by the functional units due to contention for access to the memory unit. FIG. 15 also shows that the operating speeds of the various functional units are fairly well matched to the frequency of occurrence of their respective operations. This is an important design consideration because if one unit does not retire, the other units will be stalled with their results waiting in their output buffers, and in the case of pipelined functional units intermediate results waiting in intermediate pipeline registers. Such a system is fairly well optimized if no one functional unit is more likely than another to stall the other functional units.

Figure 16:
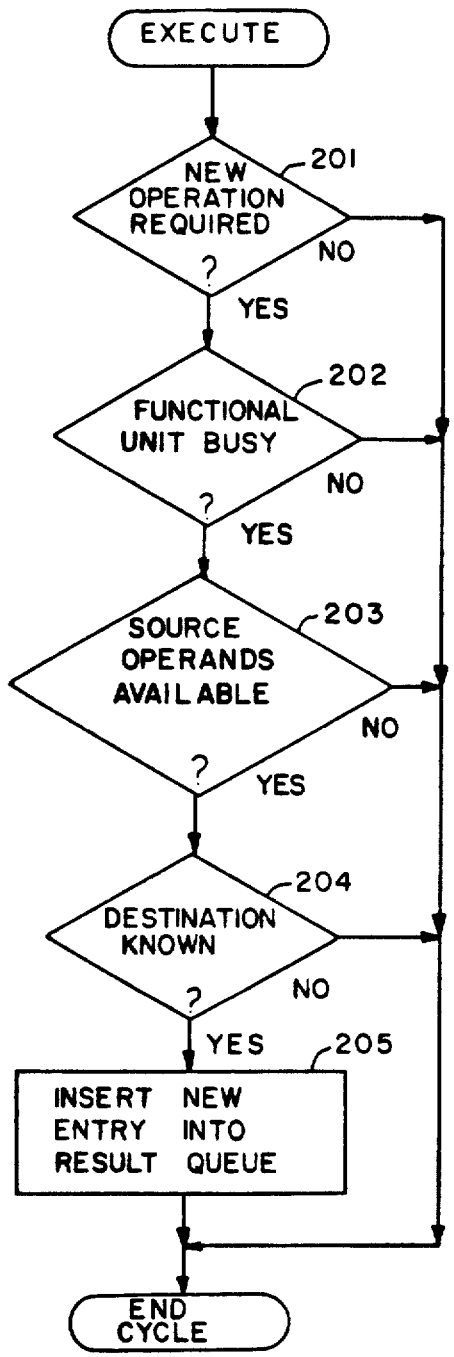
FIG. 16 is a flowchart of the control procedure followed by an instruction issue unit in the execution unit for issuing source operands to specified functional units and recording the issuance and the destination for the respective result in a result queue in the execution unit.

Turning now to FIG. 16, there is shown a flowchart summarizing the control procedure followed by the execution unit to issue source operands and requests to the functional units. In step 201, the microcode execution unit detects whether a new operation is required. If not, no use of the functional units or the result queue is necessary in the current cycle. Otherwise, in step 202 the microcode execution unit checks whether the functional unit for performing the new operation is busy and therefore cannot accept new source operands.

If the functional unit is busy, then processing of the request is finished for the current cycle. Otherwise, in step 203 the microcode execution unit tests whether source operands are available to be transferred to the required functional unit. If not, servicing of the request is completed for the current cycle. Otherwise, the execution unit determines in step 204 whether the destination is known. If not, processing is finished for the current cycle. Otherwise, in step 205, the microcode execution unit inserts a new entry into the result queue which identifies the required functional unit and includes all of the information needed for retiring the result from that functional unit. After step 205 is completed, the microcode execution unit need not be concerned about the processing of the requested operation or the retiring of the result. All of that can be monitored by the retire unit, and if the retire unit detects a problem that needs the assistance of the microcode execution unit, then it can initiate an appropriate stall, trap, or exception to transfer control of the problem to the microcode execution unit.

Figure 17:
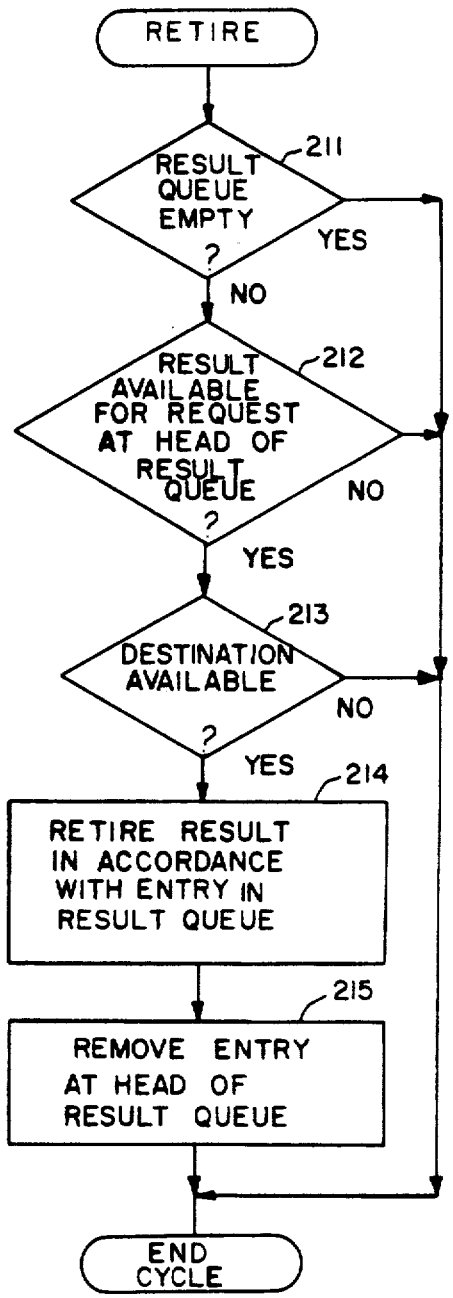
FIG. 17 is a flowchart of the control procedure followed by the retire unit for obtaining the results of the functional unit specified by the entry at the head of the retire queue, and retiring those results at a destination specified by that entry, and removing that entry from the head of the result queue.

Turning now to FIG. 17, there is shown a flowchart of the control procedure followed by the retire unit for retiring results and servicing the result queue. In a first step 211 the retire unit checks whether the result queue is empty. If so, then its servicing of the result queue is completed for the current cycle. Otherwise, in step 212 the retire unit test whether a result is available for the request at the head of the result queue. In other words, the retire unit obtains the information in that entry identifying the functional unit assigned to the request, and tests the result ready signal from that functional unit. If that result ready signal is not asserted, then the servicing of the result queue by the retire unit is finished for the current cycle. Otherwise, in step 213 the retire unit looks at the destination information in the entry at the head of the result queue and checks whether that indicated destination is available. If not, then servicing of the result queue by the retire unit is finished for the current cycle Otherwise, in step 214 the retire unit can initiate the retirement of the result in accordance with the information in the entry at the head of the result queue Once the result is retired, then in step 215 the retire unit may change the state of the execution unit to reflect that fact by removing the entry at the head of the result queue. After the entry has been removed from the head the retirement of that result is completed.

Figure 18:
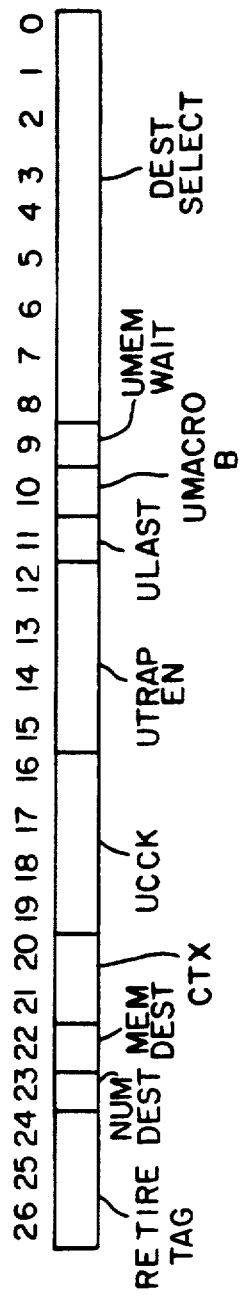
FIG. 18 is a diagram showing the information that is preferably stored in an entry of the result queue.

Turning now to FIG. 18, there is shown a diagram of a preferred format for an entry in the retire queue The entry, for example, includes 27 bits of information. The first three bits $<26:24>$ specify a RETIRE_TAG which selects a particular one of the functional units from which to receive the next result to be retired.

Bit 23, there is a flag indicating whether the result is suppose to be written somewhere, instead, for example, of just setting selected condition codes and being acknowledged by a result used signal (see FIG. 12) so that the functional unit is free to produce a result from a new set of operands.

Bit 22 is a memory destination flag indicating whether the result will be written to memory. There is no need for the entry in the result queue to indicate the memory address, since that memory address should, under usual circumstances, already have been translated to a physical memory address and be waiting for the result.

Bits $<21:20>$ designate a context field CTX indicating whether the result context is byte, word, long word or quad word. For the case of a quad word, for example, two cycles are required to retire the quad word over the 32 bit data lines, and therefore two cycles are required for retirement. The byte and word context can be used for performing a byte or word write into a 32 bit register or memory location.

The four bit field UCCK $<19:16>$ is a set of flags indicating how the condition code bits of the execution unit are to be updated. These flags, for example, enable or disable the negative bit, the zero bit, the overflow bit, and the carry bit of a processor status word.

The four bit field UTRAP_EN $<15:12>$ is a set of four trap enabling bits for enabling or disabling respective trap conditions.

Bit 11 is a flag ULAST which marks the end of a macro instruction.

Bit 10 is a flag UMACROB which marks the end of macro branches.

Bit 9 is a flag UMEM_WAIT which, when enabled, requires the retire unit to wait for acknowledgement of a successful memory write before completing subsequent retirement operations.

Finally, in bits $<8:0>$ there are nine bits designating a selected location DEST_SEL in the execution unit for receiving the result. These locations, for example, are the general purpose registers or any other registers in the execution unit that are capable of receiving a result.

We claim:

1. A method of preprocessing and executing multiple instructions in a pipelined processor, said instructions including opcodes and operand specifiers, said pipelined processor including multiple and separate functional units for executing various classes of said instructions, said method comprising the steps of:

decoding said instructions to obtain said opcodes and operand specifiers;

fetching source operands specified by said operand specifiers;

operating a microcode-controlled issue unit to issue the source operands to the respective functional units indicated by the decoded opcodes, and for each of the instructions, to insert an entry into a result queue when an instruction is issued to a functional unit and the destination for the result is known, the entry indicating the particular functional unit and the destination for the result of the functional unit, wherein instructions are issued before their destinations are known;

operating the functional units in parallel to execute the various classes of said instructions including integer instructions, floating point instructions, multiply instructions, and divide instructions; and successively retiring results by retiring the result from the functional unit indicated by the entry at the head of the result queue when the result is available and when the destination indicated by the entry is available, and removing the entry from the head of the queue.

2. The method as claimed in claim 1, wherein the entry includes a flag indicating whether the result is to be written into memory, and wherein destination addresses for results to be written to memory are not stored in the result queue, but instead are forwarded to a memory unit for address translation while the results are being obtained by the functional units.

3. The method as claimed in claim 1, wherein the entry includes a context field indicating the result context.

4. The method as claimed in claim 1, wherein the entry includes flags for enabling condition codes.

5. The method as claimed in claim 1, wherein the entry includes a flag that marks the end of a macro instruction.

6. The method as claimed in claim 1, wherein the entry includes a flag that marks the end of a macro branch.

7. The method as claimed in claim 1, wherein the entry includes a flag indicating whether the retiring of a result must wait for acknowledgement of a successful memory write operation before completing subsequent retirement operations, and wherein the retiring of a result waits for acknowledgement of a successful memory write operation when said flag indicates that the retiring of a result must wait, and the retiring of a result does not wait for acknowledgement of a successful memory write operation when said flag does not indicate that the retiring of a result must wait.

8. The method as claimed in claim 1, wherein the entry includes a flag indicating whether a result is to be written somewhere, and wherein the retiring of the result ignores the result when said flag does not indicate that the result is to be written somewhere.

9. The method as claimed in claim 1, wherein said functional units include an integer unit, and wherein said method further includes controlling said integer unit by microcode which controls said issue unit, and controlling the other functional units independently of said microcode.

10. The method as claimed in claim 1, wherein said issue unit is controlled by microcode including microcode sequences for executing respective instruction opcodes, and wherein at least one of said microcode sequences provides a destination addresses for a respective instruction, and wherein the issue unit loads the result queue with said destination address at the beginning of execution of said respective instruction.

11. A method of preprocessing and executing multiple instructions in a pipelined processor, said instructions including opcodes and operand specifiers, said pipelined processor including multiple and separate functional units for executing various classes of said instructions, said method comprising the steps of:

decoding said instructions to obtain said opcodes and operand specifiers;

fetching source operands specified by said operand specifiers;

operating a microcode-controlled issue unit to issue the source operands to the respective functional units indicated by the decoded opcodes, and for each of the instructions, to insert an entry into a result queu when an instruction is issued to a functional unit and the destination for the result is known, the entry indicating the particular functional unit and the destination for the result of the functional unit;

operating the functional units in parallel to execute the various classes of said instructions including integer instructions, floating point instructions, multiply instructions, and divide instructions, wherein said functional units include an integer unit, and wherein said method further includes controlling said integer unit by microcode which controls said issue unit, and controlling the other functional units independently of said microcode; and successively retiring results by retiring the result from the functional unit indicated by the entry at the head of the result queue when the result is available and when the destination indicated by the entry is available, and removing the entry from the head of the queue.

12. The method as claimed in claim 11, wherein the entry includes a flag indicating whether the result is to be written into memory, and wherein destination addresses for results to be written to memory are not stored in the result queue, but instead are forwarded to a memory unit for address translation while the results are being obtained by the functional units.

13. The method as claimed in claim 11, wherein the entry includes a flag that marks the end of a macro instruction.

14. The method as claimed in claim 11, wherein the entry includes a flag that marks the end of a macro branch.

15. The method as claimed in claim 11, wherein the entry includes a flag indicating whether the retiring of a result must wait for acknowledgement of a successful memory write operation before completing subsequent retirement operations, and wherein the retiring of a result waits for acknowledgement of a successful memory write operation when said flag indicates that the retiring of a result must wait, and the retiring of a result does not wait for acknowledgement of a successful memory write operation when said flag does not indicate that the retiring of a result must wait.

16. The method as claimed in claim 11, wherein the entry includes a flag indicating whether a result is to be written somewhere, and wherein the retiring of the result ignores the result when said flag does not indicate that the result is to be written somewhere.

17. The method as claimed in claim 11, wherein said issue unit is controlled by microcode including microcode sequences for executing respective instruction opcodes, and wherein at least one of said microcode sequences provides a destination addresses for a respective instruction, and wherein the issue unit loads the result queue with said destination address at the beginning of execution of said respective instruction.

18. A pipelined processor for preprocessing and executing multiple instructions, said instructions including opcodes and operand specifiers, said processor including means for decoding said instructions to obtain said opcodes and said operand specifiers, means for fetching source operands specified by said operand specifiers, multiple and separate functional units for executing various classes of said instructions, means responsive to the decoded opcodes for issuing commands and source operands to the respective functional units to initiate parallel execution of the various classes of instructions, and means for retiring results from the respective functional units, wherein said means for issuing commands and source operands includes a microcode controlled issue unit, said functional units include an integer unit controlled by said microcode, and the other functional units are controlled independently of said microcode, said means for retiring results from the respective functional units includes a result queue, means for loading entries into the result queue identifying respective functional units and respective destinations for their results, and means for retiring results from respective functional units and to respective destinations indicated by the entries in the result queue.

19. The pipelined processor as claimed in claim 18, wherein each of said entries includes a flag indicating whether the retiring of a result must wait for acknowledgement of a successful memory write operation before completing subsequent retirement operations, and wherein said means for retiring results includes means for waiting for acknowledgement of a successful memory write operation when said flag indicates that the retiring of a result must wait, and means for completing the retiring of a result without waiting for acknowledgement of a successful memory write operation when said flag does not indicate that the retiring of a result must wait.

20. The method as claimed in claim 18, wherein said issue unit is controlled by microcode including microcode sequences for executing respective instruction opcodes, and wherein at least one of said microcode sequences provides a destination addresses for a respective instruction, and wherein the issue unit includes means for loading the result queue with said destination address at the beginning of execution of said respective instruction.

* * * * *

UNITED STATES PATENT AND TRADEMARK OFFICE
CERTIFICATE OF CORRECTION

PATENT NO. : 5,067,069
DATED : November 19, 1991
INVENTOR(S) : Elaine H. Fite, et al.

It is certified that error appears in the above-indentified patent and that said Letters Patent is hereby corrected as shown below:

Column 14, line 16, change "$(SL_{13}STALL)$" to --(SL_STALL)--

Column 15, line 32, change "SRCI_PTR" to --SRC1_PTR--, and "SRCI_VALID" to --SRC1_VALID--.

Column 15, line 37, change "SRCI_VALID" to --SRC1_VALID--.

Column 15, line 42, change "printer" to --pointer--.

Column 15, line 60, add "," after --unit--.

Column 24, line 3, after "queue" add --.--.

Column 24, line 9, after "queue" add --.--.

Column 26, line 15, change "queu" to --queue--.

Signed and Sealed this

Twenty-ninth Day of March, 1994

Attest:

BRUCE LEHMAN

Attesting Officer     Commissioner of Patents and Trademarks